US012665695B2

(12) United States Patent
Shibahara et al.

(10) Patent No.: US 12,665,695 B2
(45) Date of Patent: Jun. 23, 2026

(54) SIGNAL DETECTION DEVICE, SIGNAL DETECTION METHOD, AND PROGRAM

(71) Applicant: NTT, Inc., Tokyo (JP)

(72) Inventors: Koki Shibahara, Musashino (JP);
Takayuki Kobayashi, Musashino (JP);
Fukutaro Hamaoka, Musashino (JP);
Shimpei Shimizu, Musashino (JP);
Yutaka Miyamoto, Musashino (JP)

(73) Assignee: NTT, Inc., Tokyo (JP)

( * ) Notice: Subject to any disclaimer, the term of this patent is extended or adjusted under 35 U.S.C. 154(b) by 287 days.

(21) Appl. No.: 18/691,536

(22) PCT Filed: Sep. 16, 2021

(86) PCT No.: PCT/JP2021/034116
§ 371 (c)(1),
(2) Date: Mar. 13, 2024

(87) PCT Pub. No.: WO2023/042340
PCT Pub. Date: Mar. 23, 2023

(65) Prior Publication Data
US 2024/0388376 A1 Nov. 21, 2024

(51) Int. Cl.
*H04B 10/00* (2013.01)
*H04J 14/04* (2006.01)
*H04J 14/00* (2006.01)

(52) U.S. Cl.
CPC ........... *H04J 14/04* (2013.01); *H04J 2203/00* (2013.01)

(58) Field of Classification Search
CPC .... H04B 10/2581; H04B 10/60; H04B 10/61; H04B 10/63; H04B 10/64; H04B 10/65; H04J 14/04; H04J 14/05; H04J 14/052
See application file for complete search history.

(56) References Cited

U.S. PATENT DOCUMENTS

2013/0071105 A1* 3/2013 Chang .................. H04B 7/0413
398/43
2014/0248052 A1* 9/2014 Li ...................... H04B 10/2581
398/44

OTHER PUBLICATIONS

Hamaoka et al., "Mode and Polarization Division Multiplexed Signal Detection with Single Coherent Receiver Using Mode-Selective Coherent Detection Technique," 2016 Optical Fiber Communications Conference and Exhibition (OFC), Anaheim, CA, USA, Mar. 20-24, 2016, 3 pages.

* cited by examiner

*Primary Examiner* — Daniel G Dobson
(74) *Attorney, Agent, or Firm* — Fish & Richardson P.C.

(57) ABSTRACT
One aspect of the present invention is a signal detection device including a mode demultiplexer configured to convert N (N is a natural number) spatial mode signals including a plurality of higher modes excited in a transmission path fiber into N base modes and output the N basis modes, a frequency conversion unit configured to convert N optical signals into frequencies different from each other, a multiplexing unit configured to multiplex the N optical signals having frequencies that have been converted, and a reception unit configured to photoelectrically convert a multiplexed optical signal while maintaining modulation information for a phase and polarization, perform digital signal conversion and signal processing, and demodulate an original information sequence.

8 Claims, 20 Drawing Sheets

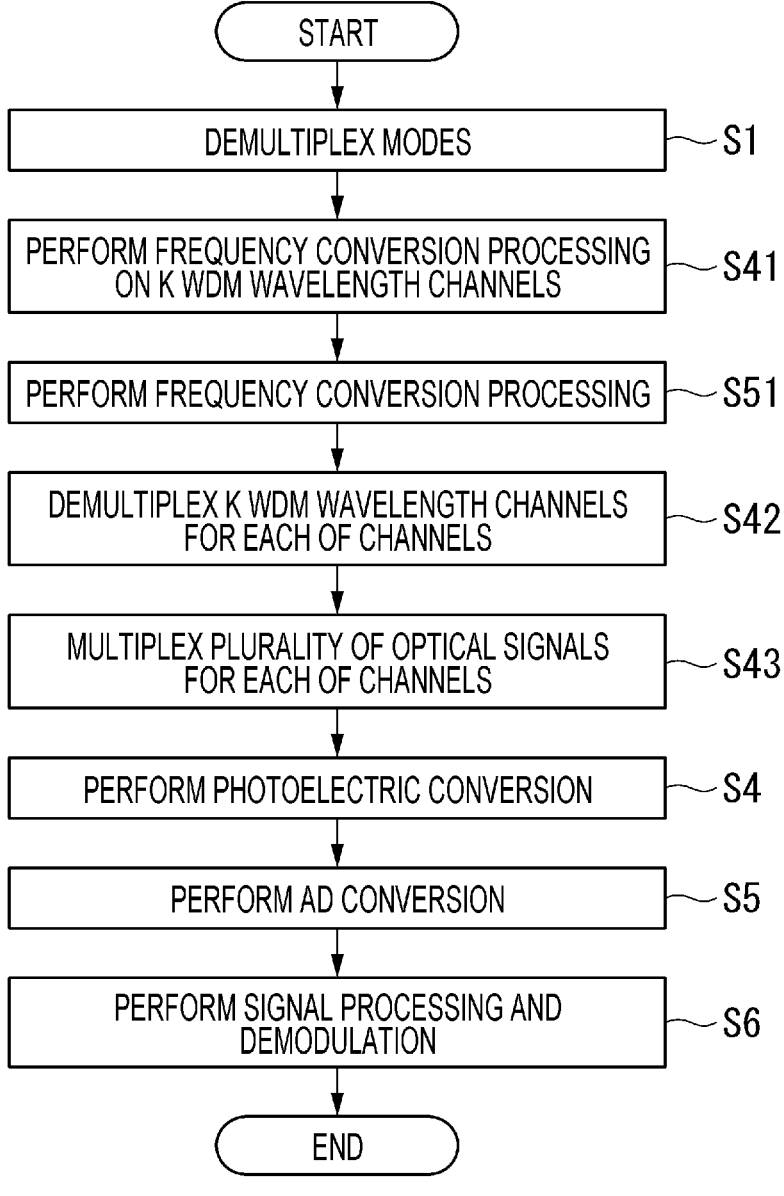

START

DEMULTIPLEX MODES — S1

PERFORM FREQUENCY CONVERSION PROCESSING ON K WDM WAVELENGTH CHANNELS — S41

PERFORM FREQUENCY CONVERSION PROCESSING — S51

DEMULTIPLEX K WDM WAVELENGTH CHANNELS FOR EACH OF CHANNELS — S42

MULTIPLEX PLURALITY OF OPTICAL SIGNALS FOR EACH OF CHANNELS — S43

PERFORM PHOTOELECTRIC CONVERSION — S4

PERFORM AD CONVERSION — S5

PERFORM SIGNAL PROCESSING AND DEMODULATION — S6

END

Fig. 16

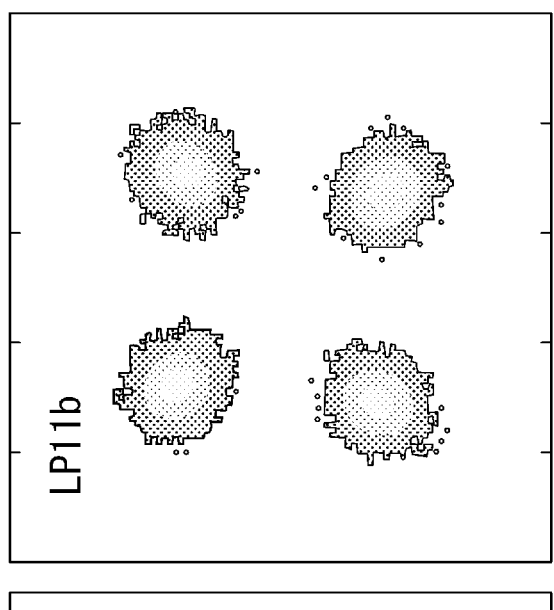
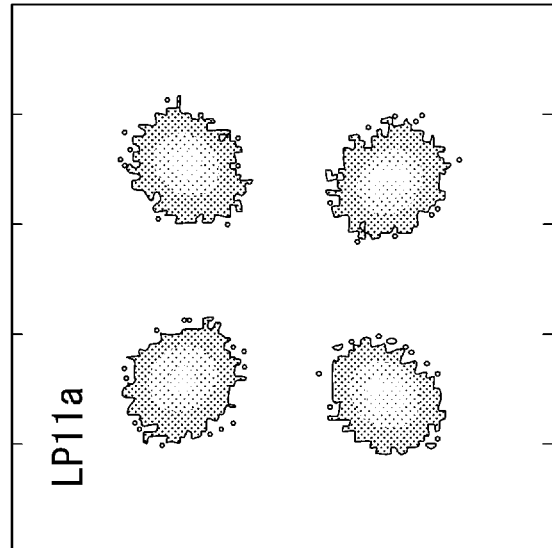
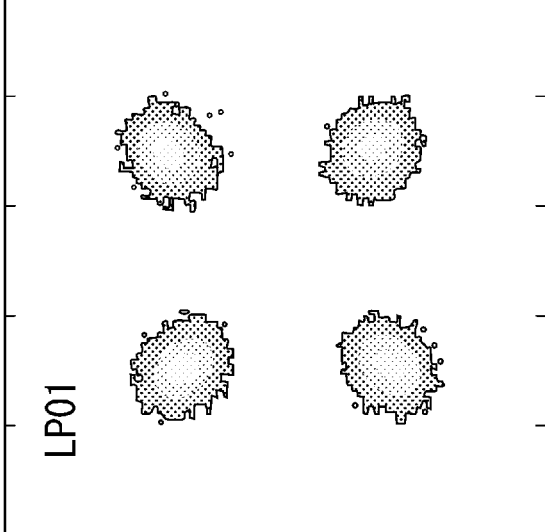
Fig. 20

SIGNAL DETECTION DEVICE, SIGNAL DETECTION METHOD, AND PROGRAM

CROSS-REFERENCE TO RELATED APPLICATIONS

This application is a National Stage application under 35 U.S.C. § 371 of International Application No. PCT/JP2021/034116, having an International Filing Date of Sep. 16, 2021.

The disclosure of the prior application is considered part of the disclosure of this application, and is incorporated by reference in its entirety into this application.

TECHNICAL FIELD

The present invention relates to technologies for a signal detection device, a signal detection method, and a program.

BACKGROUND ART

With the start of fifth generation mobile communication system (5th Generation, 5G) services, high definition video service distribution, development of Internet of Things (IoT) services, and the like in recent years, communication traffic flowing through an optical network has been increasing year by year.

As an optical fiber serving as a base of a current high-capacity optical network, a single mode fiber is used except for a local network for a short distance such as a local area network (LAN). The single mode fiber includes a single core serving as a path for an optical signal in the clad. The single mode fiber allows only single mode propagation in a wavelength band such as a C band (1528 to 1565 nm) or an L band (1570 to 1605 nm) used in a large-capacity long-distance optical network. As a result, in the single mode fiber, a large-capacity long-distance optical network that stably transfers information that reaches several terabits per second over a long distance has been implemented.

In such an optical network, for example, a digital coherent transmission technology using a digital signal processing technology and a coherent transmission/reception technology is introduced into an optical transmission device of a 100-gigabit-per-second class as a measure in an optical network against increasing communication traffic demand. The digital coherent transmission technology is a technology in which a coherent reception method and ultra-high-speed digital signal processing are combined. The coherent reception method is a reception method for detecting interference light between light on a reception side and local oscillation light. The ultra-high-speed digital signal processing is processing of digitizing a signal and then removing noise of a phase component caused by a frequency and phase fluctuation in a transmission side light source that generates signal light and a reception side light source that generates local oscillation light.

A transmission method using the digital coherent transmission technology in an optical transmission system includes, for example, polarization-multiplexed optical transmission using two modes of orthogonal polarization for a single mode fiber. In polarization-multiplexed optical transmission, different pieces of information can be superimposed on polarization having an orthogonal relationship. Furthermore, as another example of the transmission method using the digital coherent transmission technology, there is mode-multiplexed optical transmission using a plurality of spatial modes (hereinafter also referred to as "modes") in a multimode optical fiber. In the mode-multiplexed optical transmission, for example, a fiber having a core diameter expanded compared with that of a single mode fiber is used as a transmission medium. As a result, in the mode-multiplexed optical transmission, a plurality of modes can be excited even in an existing wavelength band such as the C band, and different pieces of information can be superimposed on the respective modes and transmitted. Also in a case of the mode-multiplexed optical transmission, similarly to a case of the polarization-multiplexed optical transmission, mode-multiplexed optical signals are complicatedly mixed during propagation through a multimode optical fiber. A reception device that supports a mode diversity structure receives a mixed mode-multiplexed optical signal, converts the received mode-multiplexed optical signal into a digital signal, and performs separation using multiple-input and multiple-output (MIMO) digital signal processing of a scale corresponding to the number of modes to be excited.

For example, in a multi-mode fiber that excites two linearly polarized (LP) modes, an LP01 mode that is a base mode and an LP11 mode that is a higher mode are excited. Further, by degenerate two modes of the LP11 mode (these are referred to as LP11a and LP11b) and polarization modes of each of the modes (these are referred to as X polarization and Y polarization) being utilized, in the multi-mode fiber for two LP modes, different pieces of information can be superimposed on a total of six spatial modes of LP01X, LP01Y, LP11aX, LP11aY, LP11bX, and LP11bY. Therefore, if the nonlinear optical effect of an optical fiber is ignored, the multi-mode fiber for two LP modes can, in principle, achieve transmission capacity three times larger than that of an existing single mode fiber.

CITATION LIST

Non Patent Literature

[Non Patent Literature 1] F. Hamaoka, S. Okamoto, K. Horikoshi, K. Yonenaga, A. Hirano and Y. Miyamoto, "Mode and polarization division multiplexed signal detection with single coherent receiver using mode-selective coherent detection technique," 2016 Optical Fiber Communications Conference and Exhibition (OFC), Th3A. 6 (2016)

SUMMARY OF INVENTION

Technical Problem

However, in a transmission system to which the conventional space-division multiplexing transmission technology is applied, there is an issue that the number of components in a transceiver device increases according to the number of used spatial modes. For example, in a multi-mode fiber for two LP modes, in order to use three LP modes, the number of required components and elements including a digital-to-analog converter that converts a digital signal in an optical transceiver device into an analog signal, an analog-to-digital converter that converts an analog signal into a digital signal, a driver amplifier, an optical modulator, a reception optical front end, a semiconductor optical amplifier, a photodetector, and a feedback monitor, and the like is required to be at least three times larger as compared with a system in which an existing single mode fiber is the transmission medium. As described above, in a transmission system to which the space-division multiplexing transmission technology is applied, the footprint and power consumption of an optical transceiver device included in an optical transceiver increase, and the device manufacturing cost increases due to a change in a manufacturing process of an integrated component.

As a means for reducing the number of receiver components and elements in a mode-multiplexed transmission system, for example, a mode selection coherent detection technology described in Non Patent Literature 1 has been proposed. In the technology described in Non Patent Literature 1, there is an issue that a mode multiplexer for locally generated light and a mechanism for generating synchronous light need to be provided in a form of being added for each wavelength channel, and an effect of reducing the number of components and the number of elements of the entire communication system is limited.

In view of the above circumstances, an object of the present invention is to provide a technology capable of reducing the number of components in a reception device in a transmission system to which the space-division multiplexing transmission technology is applied.

Solution to Problem

One aspect of the present invention is a signal detection device including, a mode demultiplexer configured to convert N (N is a natural number) spatial mode signals including a plurality of higher modes excited in a transmission path fiber into N base modes and output the N basis modes, a frequency conversion unit configured to convert frequencies of respective N optical signals into frequencies different from each other, a multiplexing unit configured to multiplex the N optical signals having frequencies that have been converted, and a reception unit configured to photoelectrically convert a multiplexed optical signal while maintaining modulation information for a phase and polarization, perform digital signal conversion and signal processing, and demodulate an original information sequence.

One aspect of the present invention is a signal detection method performed by a signal detection device including, converting N (N is a natural number) spatial mode signals including a plurality of higher modes excited in a transmission path fiber into N base modes and outputting the N basis modes, converting frequencies of respective N optical signals into frequencies different from each other, multiplexing the N optical signals having frequencies that have been converted, and photoelectrically converting a multiplexed optical signal while maintaining modulation information for a phase and polarization, performing digital signal conversion and signal processing, and demodulating an original information sequence.

One aspect of the present invention is a program for causing a computer to function as the above signal detection device.

Advantageous Effects of Invention

According to the present invention, the number of components in a reception device can be reduced in a transmission system to which the space-division multiplexing transmission technology is applied.

BRIEF DESCRIPTION OF DRAWINGS

FIG. 16 is a flowchart of a processing procedure example of a signal detection device according to the sixth embodiment.

FIG. 20 is a diagram showing constellation examples of QPSK obtained according to the first embodiment.

DESCRIPTION OF EMBODIMENTS

Embodiments of the present invention will be described in detail with reference to the drawings.

First Embodiment

Figure 1:
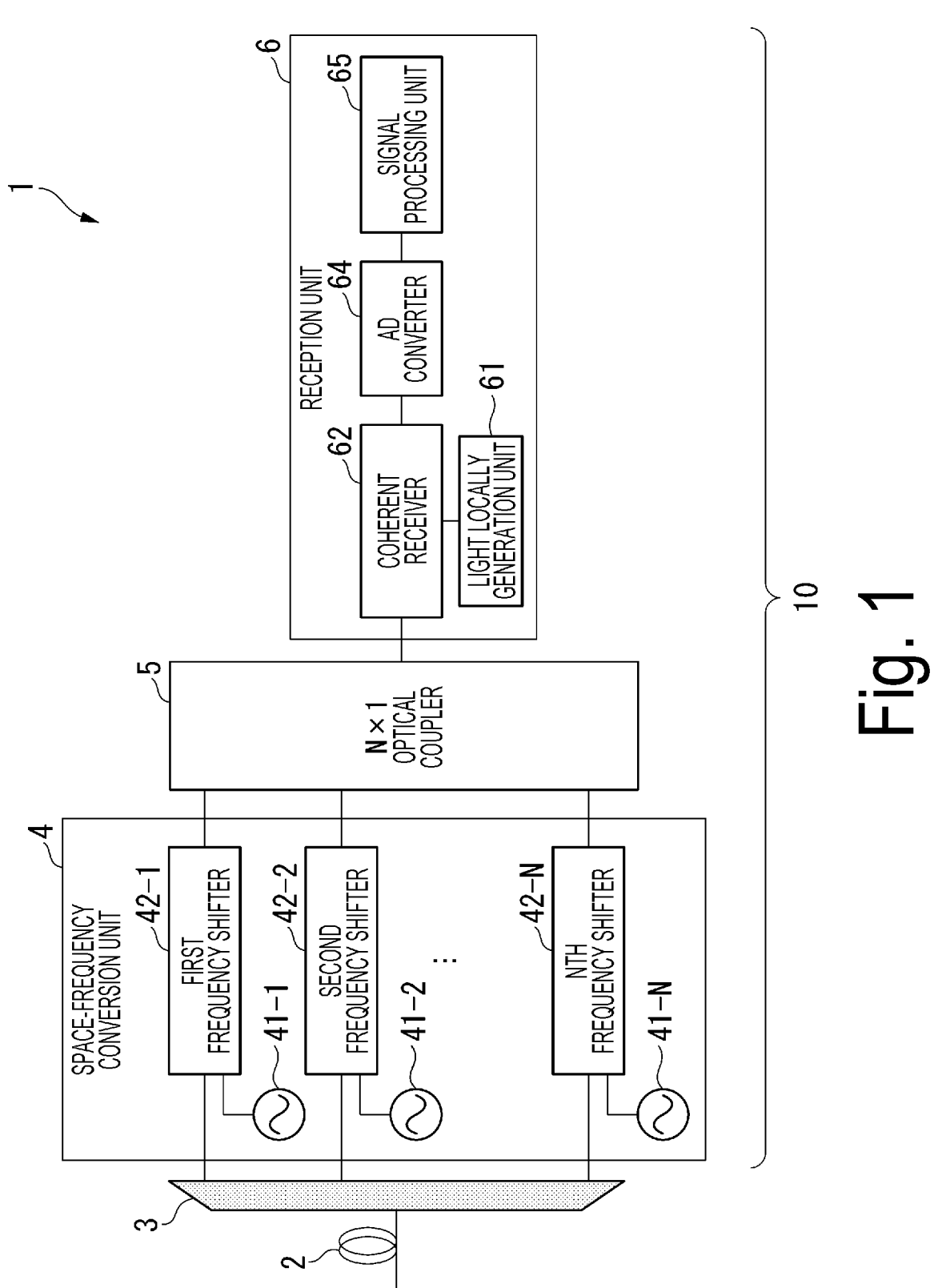
FIG. 1 is a diagram showing a configuration example of a signal detection device according to a first embodiment.

FIG. 1 is a diagram showing a configuration example of a signal detection system according to the present embodiment. As shown in FIG. 1, a signal detection system 1 includes a signal detection device 10 and an optical transmission fiber 2.

The signal detection device 10 includes a mode demultiplexer 3, space-frequency conversion unit 4 (frequency conversion unit), an N×1 optical coupler 5 (combiner) (multiplexing unit), and a reception unit 6.

The space-frequency conversion unit 4 includes, for example, N (N is an integer of 1 or more) clock units 41 (first clock unit 41-1, second clock unit 41-2, . . . , Nth clock unit 41-N) and N frequency shifters 42 (first frequency shifter 42-1, second frequency shifter 42-2, . . . , Nth frequency shifter 42-N).

The reception unit 6 includes, for example, a light locally reception unit 61, a coherent receiver 62, an AD converter 64, and a signal processing unit 65.

Note that the configuration shown in FIG. 1 is an example, and the configuration is not limited thereto.

The signal detection device 10 demodulates a signal sequence transmitted from the transmission side without an error in information by converting an optical signal propagated through the transmission path fiber 2 into a digital signal through photoelectric conversion, and then performing various types of signal processing.

The transmission path fiber 2 is, for example, a spatial multiplexing fiber capable of exciting a plurality of spatial modes in a predetermined optical communication band, such as a multimode fiber.

The mode demultiplexer 3 converts N spatial mode signals including a plurality of higher modes excited in the transmission path fiber 2 into N base modes and outputs the N base modes.

The space-frequency conversion unit 4 converts the frequency of each optical signal. The space-frequency conversion unit 4 converts the frequencies of respective N optical signals into frequencies different from each other. In the present embodiment, the space-frequency conversion unit 4 performs frequency conversion by frequency-shifting each of the optical signals.

Each of the N clock units 41 generates and outputs a clock signal having a frequency f. Note that the N clock units are desirably synchronized by a means such as an external clock for synchronization from the viewpoint of reducing a load on the signal processing unit, but the N clock units may not necessarily be synchronized.

Optical signal outputs from the mode demultiplexer 3 and clock signals from the clock units 41 are input to the N frequency shifters 42. The nth (n is one of 1 to N) frequency shifter 42-$n$ gives a frequency shift amount of n$\Delta$f to an optical signal. That is, the first frequency shifter 42-1 gives a frequency shift amount of $\Delta$f, and the second frequency shifter 42-2 gives a frequency shift amount of 2$\Delta$f to an optical signal. Note that the frequency shift in the frequency shifters 42 can be implemented by, for example, a Mach-Zehnder type optical modulator including a lithium niobate based waveguide using an electro-optical effect (for example, Reference Literature 1), but is not limited thereto as long as it has a function of a predetermined frequency shift.

Reference Literature 1; M. Izutsu, S. Shikama, and T. Sueta, "Integrated optical SSB modulator/frequency shifter," IEEE J. Quantum Electron. 17 (11), 2225-2227 (1981).

The N×1 optical coupler 5 (multiplexing unit) multiplexes and outputs optical signals output from the frequency shifters. Note that the N×1 optical coupler may be, for example, a combiner that couples a plurality of laser beams to one fiber.

The reception unit 6 decodes signals by mixing received signal light and locally generated light and outputs the signals to, for example, an external device.

The light locally reception unit 61 includes, for example, a laser diode as a light source, and emits and outputs locally received light.

The coherent receiver 62 includes, for example, a phase and polarization diversity configuration. The coherent receiver 62 performs conversion into analog electrical signals by photoelectric conversion while maintaining modulation information for a phase and polarization by received and multiplexed reception signals and locally generated light input.

The AD converter 64 converts the analog electrical signals into digital signals by sampling processing.

The signal processing unit 65 performs predetermined signal processing including, for example, waveform distortion removal, MIMO type signal processing, frequency offset compensation, phase noise compensation, error correction decoding, and the like, and demodulates the original correct information sequence (symbol sequence or binary sequence).

Next, optical spectra of an input unit and an output unit of an optical signal of the N×1 optical coupler 5 will be described.

Figure 2:
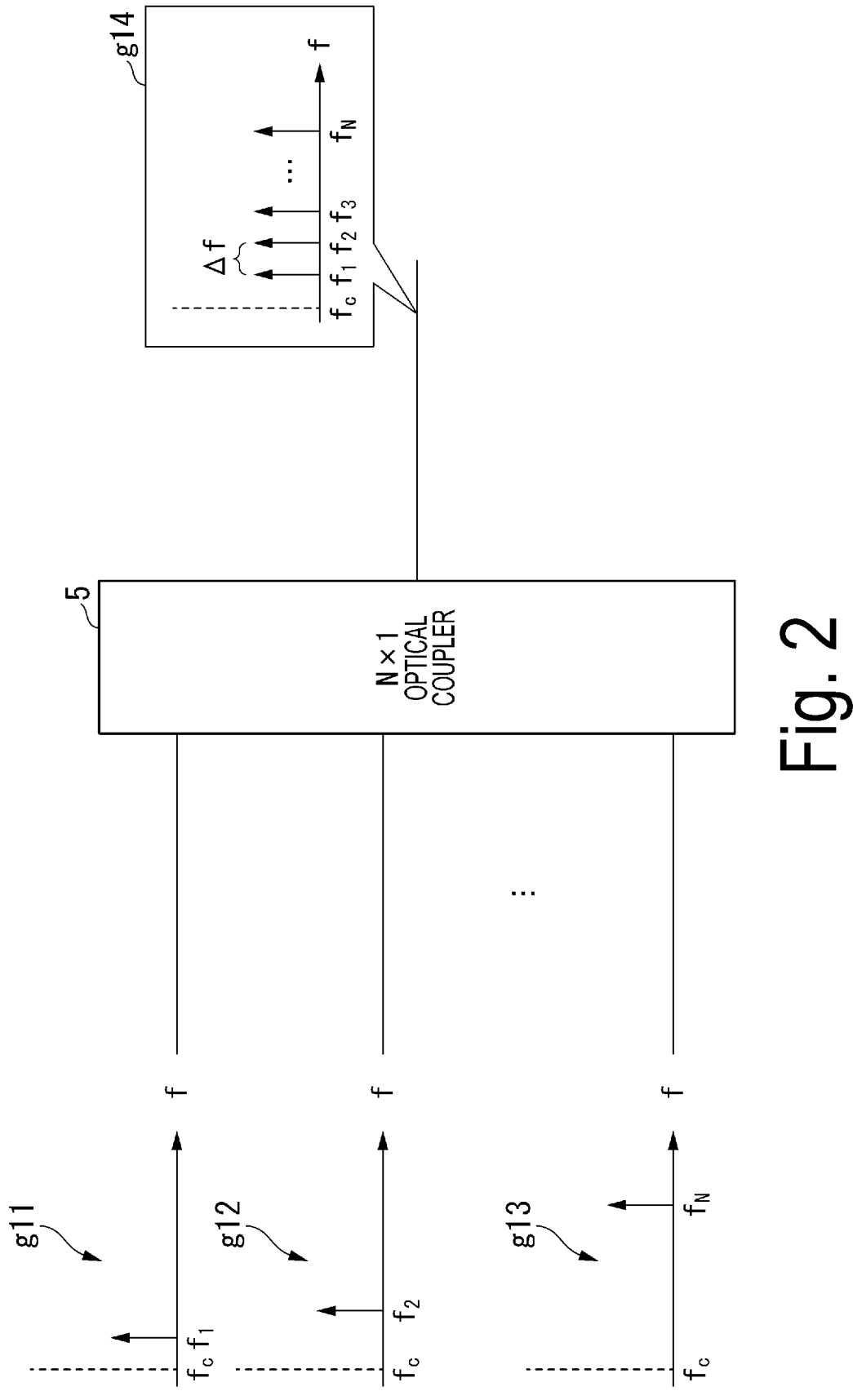
FIG. 2 is a diagram showing optical spectra of an input unit and an output unit of an optical signal of an N×1 optical coupler according to the first embodiment.

FIG. 2 is a diagram showing optical spectra of an input unit and an output unit of an optical signal of an N×1 optical coupler according to the present embodiment. As shown in FIG. 2, signals input to the N×1 optical coupler 5 are subjected to a frequency shift of n$\Delta$f as compared with an original carrier wave frequency $f_c$ by the respective frequency shifters 42. The N×1 optical coupler 5 multiplexes n optical signals (g11 to g13) to obtain optical signals arranged on the frequency axis at intervals of $\Delta$f like an optical spectrum g14.

Next, a processing procedure example of the signal detection device 10 will be described.

Figure 3:
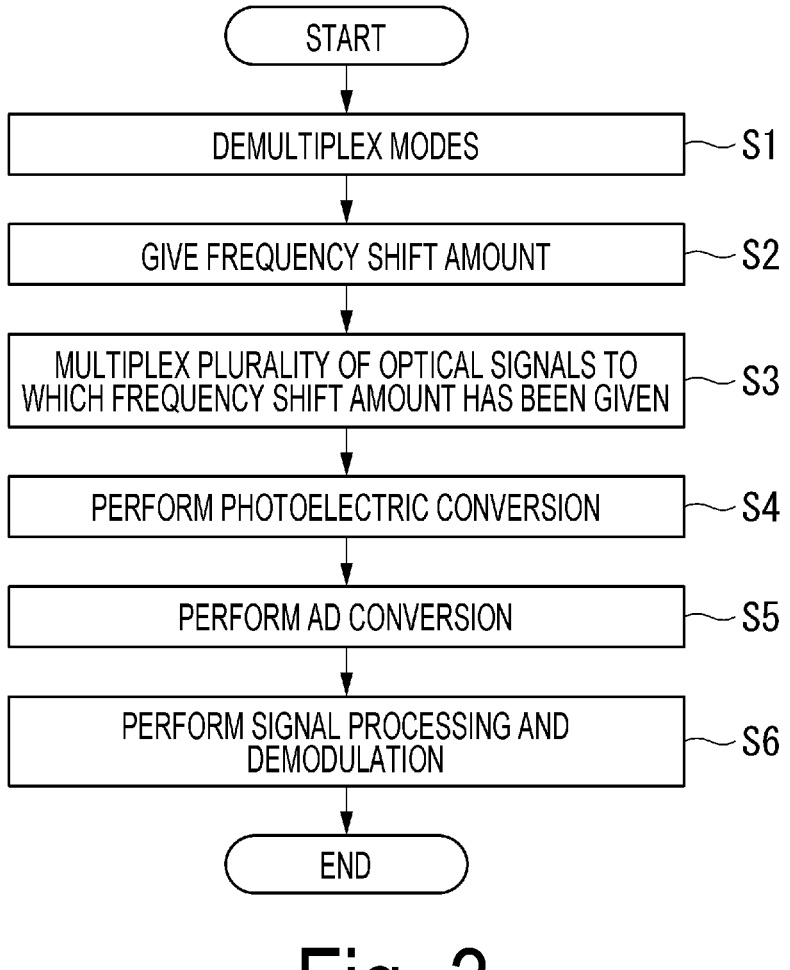
FIG. 3 is a flowchart of a processing procedure example of the signal detection device according to the first embodiment.

FIG. 3 is a flowchart of a processing procedure example of a signal detection device according to the present embodiment.

(Step S1) The mode demultiplexer 3 converts N spatial mode signals including a plurality of higher modes excited in the transmission path fiber 2 into N base modes.

(Step S2) The nth frequency shifter 42-$n$ converts the frequency of an optical signal by giving a frequency shift amount of n$\Delta$f to an optical signal.

(Step S3) The N×1 optical coupler 5 multiplexes optical signals output from the respective frequency shifters 42.

(Step S4) The coherent receiver 62 performs conversion into analog electrical signals by photoelectric conversion while maintaining modulation information for a phase and polarization by reception signals and locally generated light input.

(Step S5) The AD converter 64 converts the analog electrical signals into digital signals by sampling processing.

(Step S6) The signal processing unit 65 performs predetermined signal processing including, for example, waveform distortion removal, MIMO type signal processing, frequency offset compensation, phase noise compensation, error correction decoding, and the like, and demodulates the original correct information sequence.

In the signal detection device 10 formed as described above, N spatial modes are received by the single reception unit 6 using the transmission path fiber by locally generated light being mixed with output signals of the N×1 optical coupler 5 and photoelectric conversion by intradyne coherent detection or heterodyne coherent detection being performed by a photodetector, so that the number of components in the signal detection device 10 can be reduced.

In the conventional configuration, N reception units are required, but according to the present embodiment, one reception unit 6 is sufficient for implementation. Even in a digital domain digitally obtained by converting by the AD converter 64, reception signals are arranged with frequency intervals of Δf being maintained on the frequency axis under a condition that the sampling theorem in which aliasing does not occur is satisfied. Furthermore, according to the present embodiment, one reception unit 6 can obtain a reception signal sequence equivalent to signals received by N reception units of the conventional configuration under a condition that the sampling speed limitation of the AD converter 64 and the band limitation of each device can be ignored by a frequency shift of −nΔf being performed on the obtained nth signal by digital signal processing and the nth signal being converted into a baseband signal.

In the above example, a case of coherent reception using locally generated light has been described as an example, but the reception method may be a direct reception form in which locally generated light is not used.

Furthermore, in the above example, a configuration in which N spatial modes are received by a single reception function unit has been described, but the effect of the present embodiment is not limited thereto. For example, in the configuration of the signal detection device 10, N spatial modes may be divided into p groups (p is an integer of 1 or more and N or less), and p configurations that perform reception by the reception function unit after a predetermined frequency shift and multiplexing may be arranged in parallel. Note that p is a number determined by the bandwidth and the required cost of configuration devices of the reception unit 6, and at this time, an effect of reducing reception units 6 corresponds to 1/p in the number of the entire reception units as compared with the conventional configuration.

Second Embodiment

Figure 4:
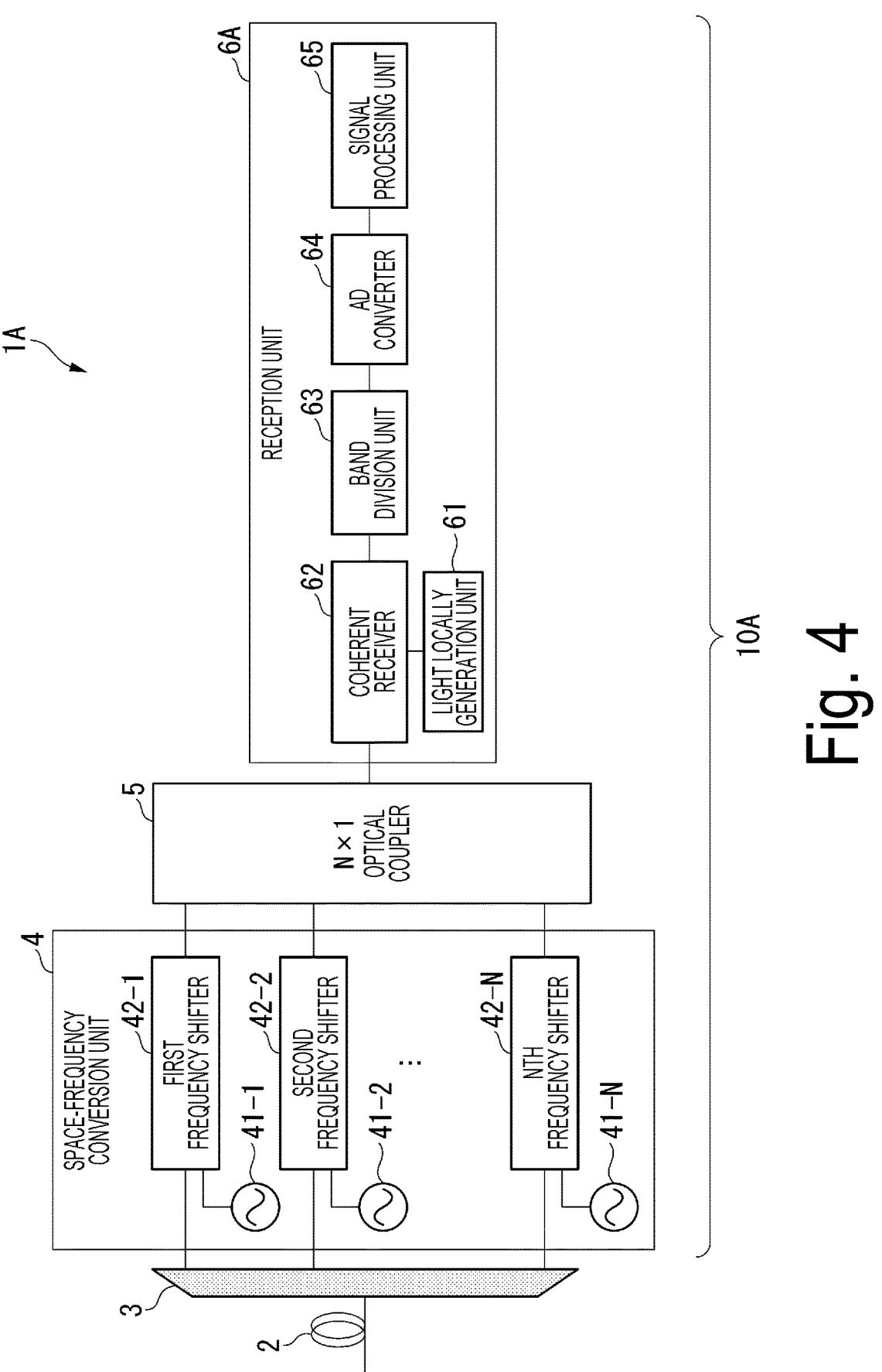
FIG. 4 is a diagram showing a configuration example of a signal detection system according to a second embodiment.

FIG. 4 is a diagram showing a configuration example of a signal detection system according to the present embodiment. As shown in FIG. 4, a signal detection system 1A includes a signal detection device 10A and an optical transmission fiber 2.

The signal detection device 10A includes a mode demultiplexer 3, a space-frequency conversion unit 4 (frequency conversion unit), an N×1 optical coupler 5 (multiplexing unit), and a reception unit 6A.

The reception unit 6A includes, for example, a light locally reception unit 61, a coherent receiver 62, a band division unit 63, an AD converter 64, and a signal processing unit 65.

Note that the configuration shown in FIG. 4 is an example, and the configuration is not limited thereto.

The space-frequency conversion unit 4 converts the frequency of each optical signal. In the present embodiment, similarly to the first embodiment, the space-frequency conversion unit 4 performs frequency conversion by frequency-shifting each optical signal.

The band division unit 63 outputs analog electrical signals to the AD converter 64 as a plurality of parallelized signals. The function of band division of the band division unit 63 means, for example, that analog electrical signals are divided into high frequency and low frequency side bands, and the center of each side band is converted into a frequency corresponding to a DC component and output, and can be implemented by, for example, a broadband circuit mounting technology as indicated in Reference Literature 2. Note that analog electrical signals obtained by photoelectrically converting by the coherent receiver 62 are arranged on the frequency axis at frequency intervals of Δf by respective frequency shifters.

Reference Literature 2; F. Hamoaka et al., "Ultra-wideband Optical Receiver Using Electrical Spectrum Decomposition Technique," WeIC-3, ECOC2020.

Next, a processing procedure example of the signal detection device 10A will be described.

Figure 5:
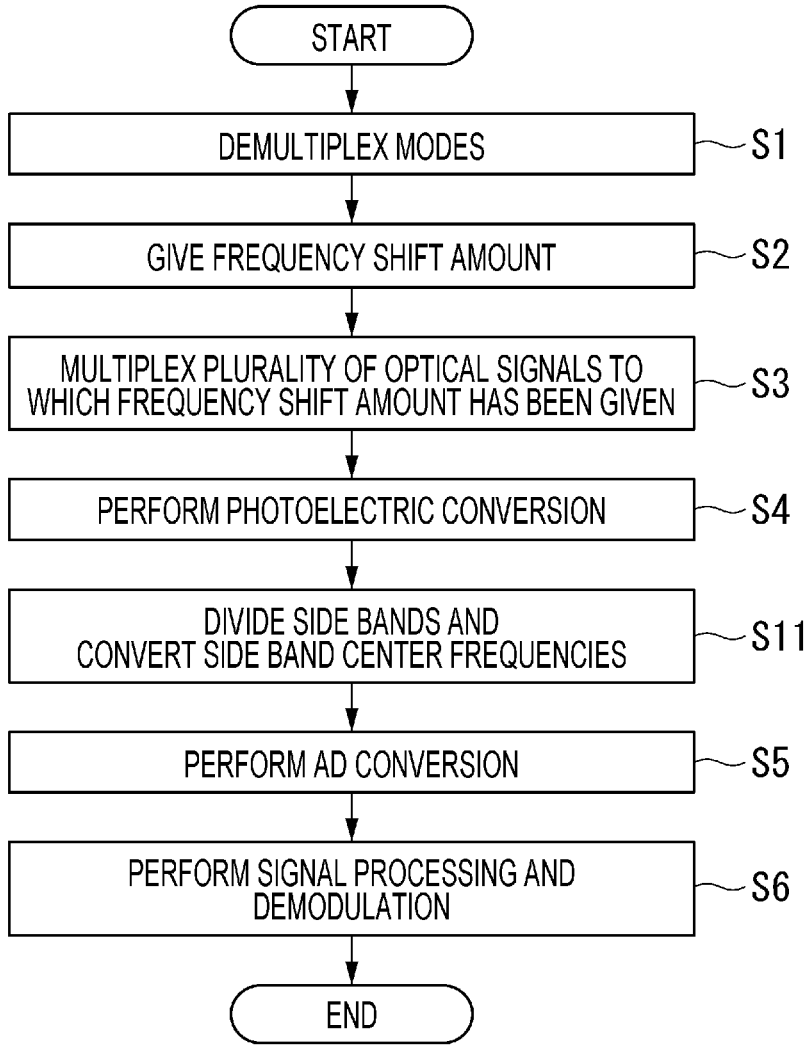
FIG. 5 is a flowchart of a processing procedure example of a signal detection device according to the second embodiment.

FIG. 5 is a flowchart of a processing procedure example of a signal detection device according to the present embodiment.

(Step S1) The mode demultiplexer 3 converts N spatial mode signals including a plurality of higher modes excited in the transmission path fiber 2 into N base modes.

(Step S2) The nth frequency shifter 42-$n$ converts the frequency of an optical signal by giving a frequency shift amount of nΔf to an optical signal.

(Step S3) The N×1 optical coupler 5 multiplexes optical signals output from the respective frequency shifters 42.

(Step S4) The coherent receiver 62 performs conversion into analog electrical signals by photoelectric conversion while maintaining modulation information for a phase and polarization by reception signals and locally generated light input.

(Step S11) The band division unit 63 outputs the analog electrical signals to the AD converter 64 as a plurality of parallelized signals.

(Step S5) The AD converter 64 converts the analog electrical signals into digital signals by sampling processing.

(Step S6) The signal processing unit 65 performs predetermined signal processing including, for example, waveform distortion removal, MIMO type signal processing, frequency offset compensation, phase noise compensation, error correction decoding, and the like, and demodulates the original correct information sequence.

As described above, in the present embodiment, since the reception unit 6A further includes the band division unit 63, the highest frequencies included in analog electrical signals are reduced, and requirement conditions of the band limitation and the operation frequency limitation on an electric circuit and a digital circuit in the subsequent stage can be expected to be loosened.

Note that, in the present embodiment, an example in which the band division unit performs division into two sidebands and outputting has been described, however, the present embodiment is not limited thereto, and the band division unit may have a function of converting an input of a single analog electrical signal into q (q is an integer of 1 or more and N or less) low-speed output signals. That is, the band division unit 63 may perform digital signal processing and signal processing after performing division into parallel signals including a plurality of signal bands.

Third Embodiment

Figure 6:
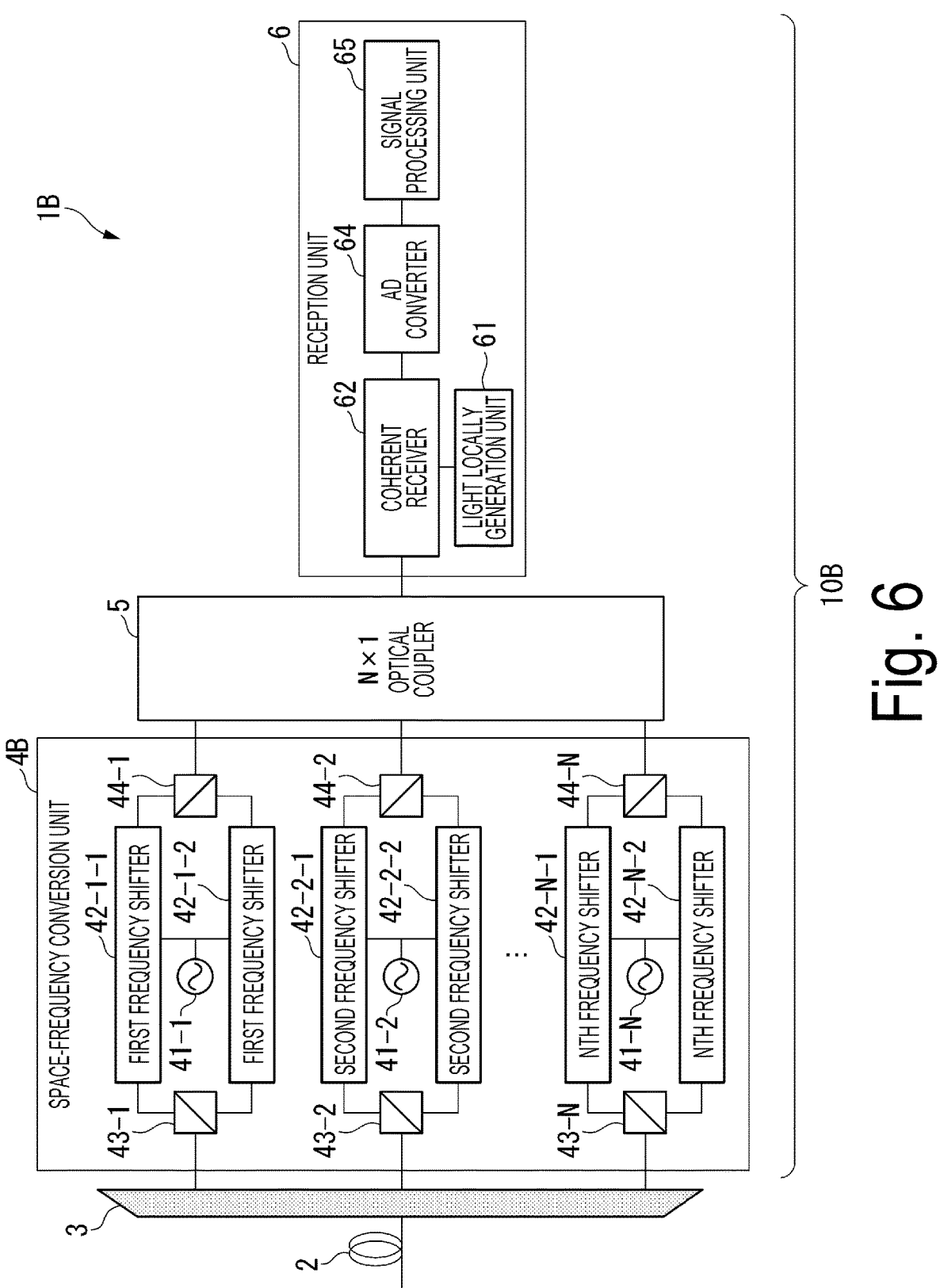
FIG. 6 is a diagram showing a configuration example of a signal detection system according to a third embodiment.

FIG. 6 is a diagram showing a configuration example of a signal detection system according to the present embodiment. As shown in FIG. 6, a signal detection system 1B includes a signal detection device 10B and an optical transmission fiber 2.

The signal detection device 10B includes a mode demultiplexer 3, a space-frequency conversion unit 4B (frequency conversion unit), an N×1 optical coupler 5 (multiplexing unit), and a reception unit 6.

The space-frequency conversion unit 4B includes, for example, N clock units 41 (first clock unit 41-1, second clock unit 41-2, . . . , Nth clock unit 41-N), 2N frequency shifters 42 (first frequency shifter 42-1-1, first frequency shifter 42-1-2, second frequency shifter 42-2-1, second frequency shifter 42-2-2, . . . , Nth frequency shifter 42-N–1, Nth frequency shifter 42-N–2), polarized light beam splitters 43 (43-1, 43-2, . . . , 43-N), and polarized light beam combiners 44 (44-1, 44-2, . . . , 44-N).

Note that the configuration shown in FIG. 6 is an example, and the configuration is not limited thereto.

The space-frequency conversion unit 4B converts the frequency of each optical signal. In the present embodiment, the space-frequency conversion unit 4 performs frequency conversion by frequency-shifting each optical signal for each change, and outputs signals obtained by the conversion.

The space-frequency conversion unit 4B includes two frequency shifters 42-$n$–1, 2 for each optical signal sequence. A polarization beam splitter 43 is connected to each input of the two frequency shifters 42-$n$–1, and a polarization beam combiner 44 is connected to each output of the two frequency shifters.

An optical modulator that implements frequency shift is generally a waveguide type, and thus has polarization dependency for input light. Therefore, in the present embodiment, the polarization beam splitters 43 or the polarization beam combiners 44 are provided before and after the input of the frequency shifters 42, and polarization diversity is achieved to enable support for a polarization multiplexed signal.

The polarization beam splitters 43 are optical elements, and separate each optical signal output from the mode demultiplexer 3 into S-polarized light and P-polarized light.

The nth frequency shifter 42-$n$–1 gives a frequency shift amount of nΔf to the S-polarized light. The nth frequency shifter 42-$n$–2 converts the frequency of an optical signal by giving a frequency shift amount of nΔf to the P-polarized light.

The polarization beam combiners 44 are optical elements, multiplex an optical signal output from the nth frequency shifter 42-$n$–1 and an optical signal output from the nth frequency shifter 42-$n$–2, and output the multiplexed signals to the N×1 optical coupler 5.

Next, a processing procedure example of the signal detection device 10B will be described.

Figure 7:
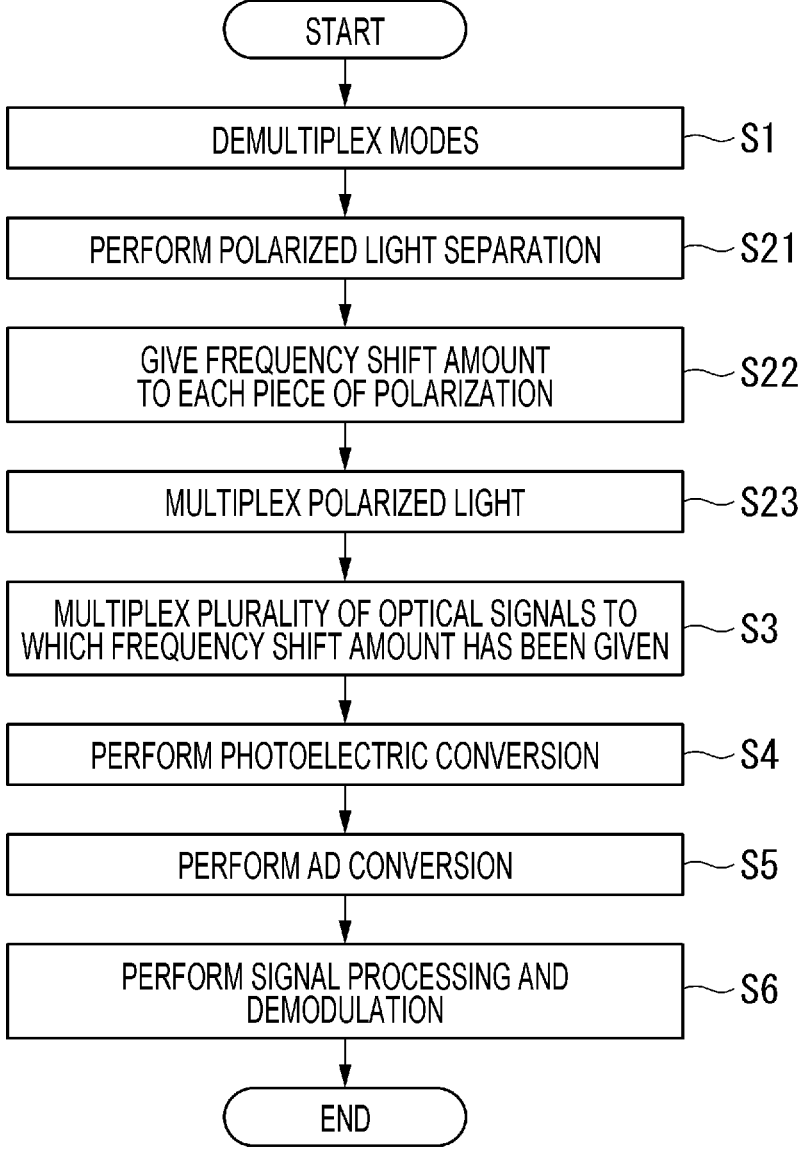
FIG. 7 is a flowchart of a processing procedure example of a signal detection device according to the third embodiment.

FIG. 7 is a flowchart of a processing procedure example of a signal detection device according to the present embodiment.

(Step S1) The mode demultiplexer 3 converts N spatial mode signals including a plurality of higher modes excited in the transmission path fiber 2 into N base modes.

(Step S21) The polarization beam splitters 43 separate each optical signal output from the mode demultiplexer 3 into S-polarized light and P-polarized light.

(Step S22) The frequency shifters 42 convert the frequencies of optical signals by giving a frequency shift amount of Δf to the S-polarized light or the P-polarized light.

(Step S23) The polarization beam combiners 44 are optical elements, and multiplex an optical signal output from the nth frequency shifter 42-$n$–1 and an optical signal output from the nth frequency shifter 42-$n$–2.

(Step S3) The N×1 optical coupler 5 multiplexes optical signals output from the respective frequency shifters 42.

(Step S4) The coherent receiver 62 performs conversion into analog electrical signals by photoelectric conversion while maintaining modulation information for a phase and polarization by reception signals and locally generated light input.

(Step S5) The AD converter 64 converts the analog electrical signals into digital signals by sampling processing.

(Step S6) The signal processing unit 65 performs predetermined signal processing including, for example, waveform distortion removal, MIMO type signal processing, frequency offset compensation, phase noise compensation, error correction decoding, and the like, and demodulates the original correct information sequence.

As described above, in the present embodiment, the polarization beam splitters 43 or the polarization beam combiners 44 are provided before and after the input of the frequency shifters 42, and a frequency shift amount is given to each piece of polarized light.

As a result, according to the present embodiment, polarization diversity can be achieved and a polarization multiplexed signal can be supported.

Note that the reception unit 6 may be the reception unit 6B of the second embodiment including the band division unit 63.

Fourth Embodiment

In the present embodiment, an example will be described in which a space-frequency conversion unit collectively processes wavelength division multiplexing (WDM) signals in which optical signals of respective spatial modes propagated through an optical transmission fiber 2 each include K (K is an integer of 1 or more) wavelength multiplexed signals.

Figure 8:
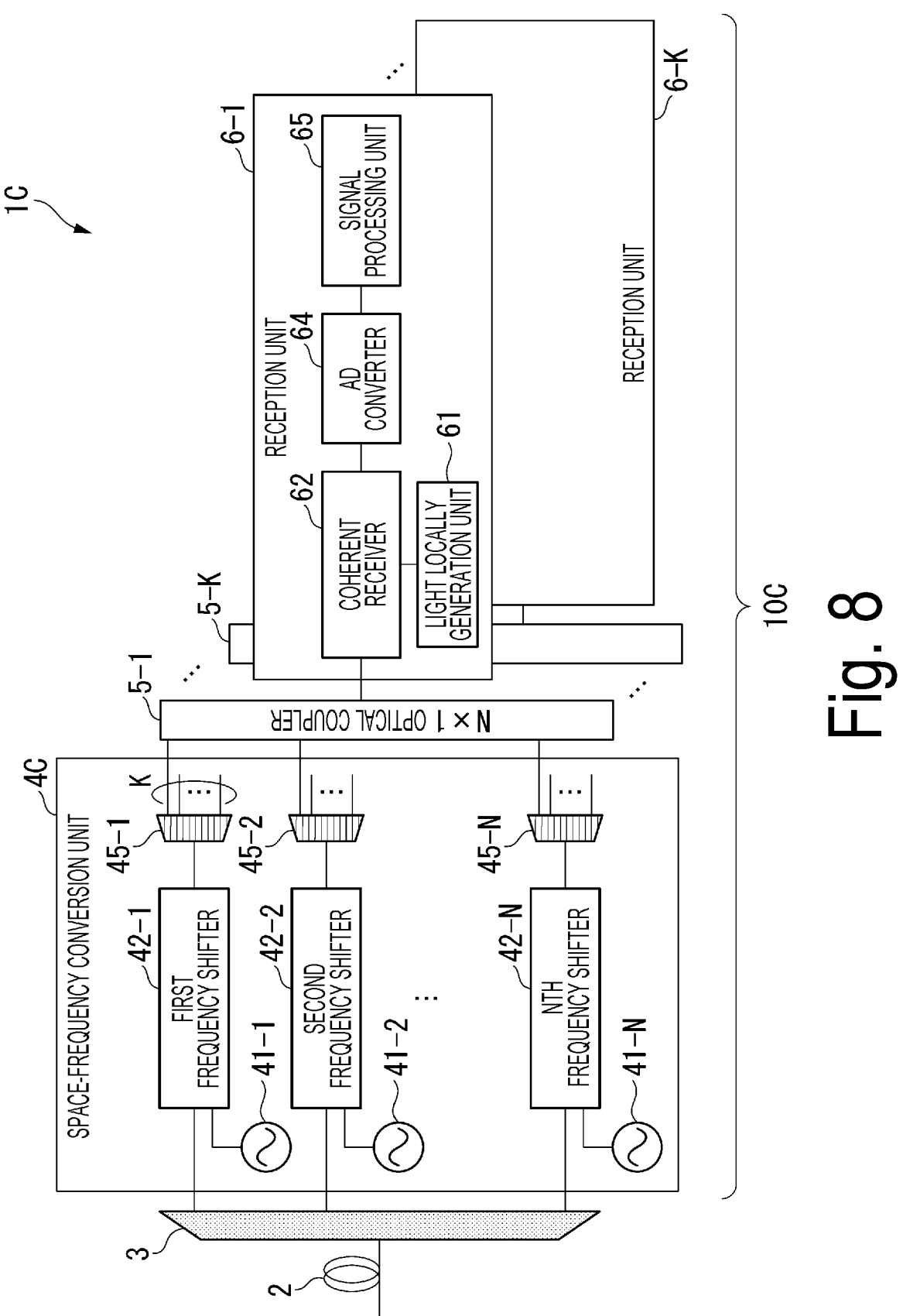
FIG. 8 is a diagram showing a configuration example of a signal detection system according to a fourth embodiment.

FIG. 8 is a diagram showing a configuration example of a signal detection system according to the present embodiment. As shown in FIG. 8, a signal detection system 1C includes a signal detection device 10C and the optical transmission fiber 2.

The signal detection device 10C includes a mode demultiplexer 3, a space-frequency conversion unit 4C (frequency conversion unit), K N×1 optical couplers 5 (multiplexing unit) (N×1 optical coupler 5-1, . . . , N×1 optical coupler 5-K), and K reception units 6 (reception unit 6-1, . . . , reception unit 6-K).

The space-frequency conversion unit 4C includes, for example, N (N is an integer of 1 or more) clock units 41 (first clock unit 41-1, second clock unit 41-2, . . . , Nth clock unit 41-N), N frequency shifters 42 (first frequency shifter 42-1, second frequency shifter 42-2, . . . , Nth frequency shifter 42-N), and WDM demultiplexers 45 (WDM demultiplexer 45-1, WDM demultiplexer 45-2, . . . , WDM demultiplexer 45-N).

Note that the configuration shown in FIG. 8 is an example, and the configuration is not limited thereto.

The space-frequency conversion unit 4C converts the frequency of each optical signal. In the present embodiment, the space-frequency conversion unit 4C frequency-shifts each optical signal to convert the frequency of the optical signal, and the WDM demultiplexers 45 further perform demultiplexing for each channel.

The nth frequency shifter 42-$n$ converts the frequency of an optical signal by collectively giving a frequency shift amount of nΔf to K WDM wavelength channels.

The WDM demultiplexers 45 demultiplex K WDM wavelength channels for each of the channels.

The N×1 optical couplers 5 multiplex and output output signals for each of the wavelength channels.

The K reception units 6 perform reception processing and demodulation processing on the wavelength channels by a means similar to the first embodiment.

Figure 9:
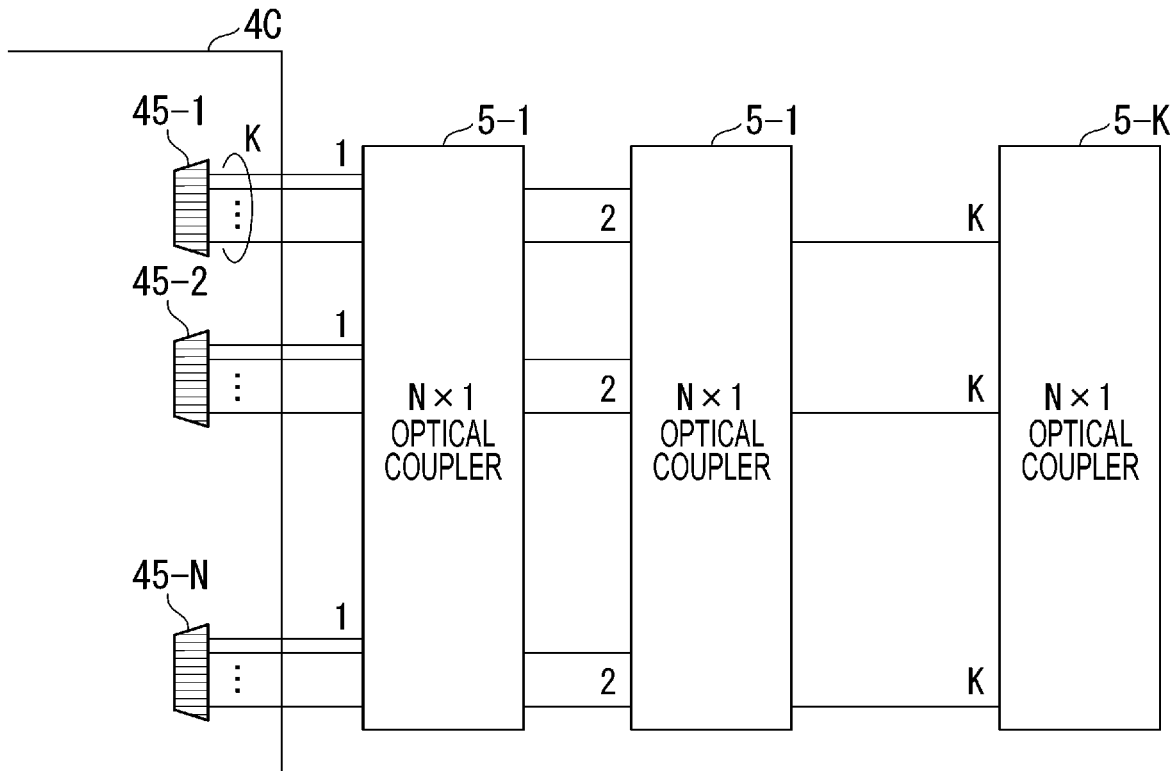
FIG. 9 is a diagram showing a connection relationship between WDM demultiplexers and K N×1 optical couplers of a space-frequency conversion unit according to the fourth embodiment.

FIG. 9 is a diagram showing a connection relationship between WDM demultiplexers and K N×1 optical couplers of a space-frequency conversion unit according to the present embodiment. As shown in FIG. 9, first channel signals of the respective WDM demultiplexers 45-1 to 45-N are input to the N×1 optical coupler 5-1, second channel signals of the respective WDM demultiplexers 45-1 to 45-N are input to the N×1 optical coupler 5-2, . . . , and K-th channel signals of the respective WDM demultiplexers 45-1 to 45-N are input to the N×1 optical coupler 5-K.

Next, a processing procedure example of the signal detection device 10C will be described.

Figure 10:
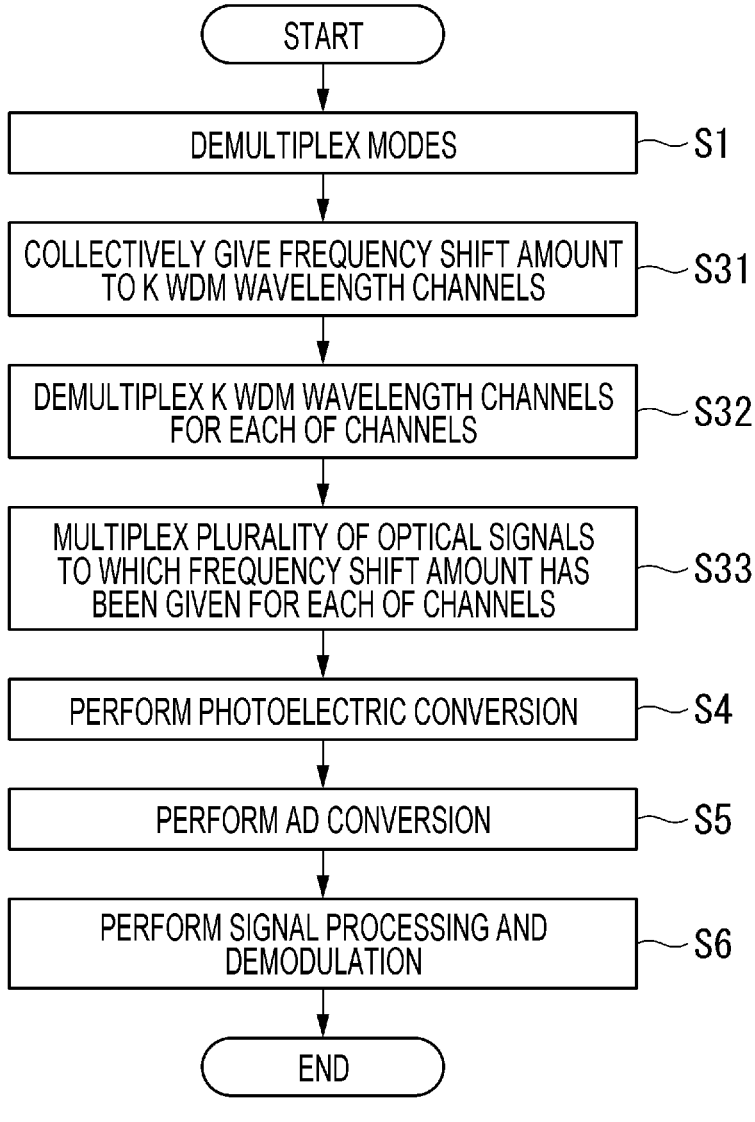
FIG. 10 is a flowchart of a processing procedure example of a signal detection device according to the fourth embodiment.

FIG. 10 is a flowchart of a processing procedure example of a signal detection device according to the present embodiment.

(Step S1) The mode demultiplexer 3 converts N spatial mode signals including a plurality of higher modes excited in the transmission path fiber 2 into N base modes.

(Step S31) The nth frequency shifter 42-*n* converts the frequency of an optical signal by collectively giving a frequency shift amount of nΔf to K WDM wavelength channels.

(Step S32) The WDM demultiplexers 45 demultiplex K WDM wavelength channels for each of the channels.

(Step S33) The N×1 optical couplers 5 multiplex output signals for each of the wavelength channels in optical signals to which the frequency shift amount has been given.

(Step S4) The coherent receiver 62 performs conversion into analog electrical signals by photoelectric conversion while maintaining modulation information for a phase and polarization by reception signals and locally generated light input.

(Step S5) The AD converter 64 converts the analog electrical signals into digital signals by sampling processing.

(Step S6) The signal processing unit 65 performs waveform distortion removal, MIMO type signal processing, frequency offset compensation, phase noise compensation, error correction decoding, and the like, and demodulates the original correct information sequence.

As described above, in the present embodiment, the space-frequency conversion unit 4C includes the WDM demultiplexers 45 at the subsequent stage of the respective frequency shifters 42, and output signals for each wavelength channel are multiplexed by the N×1 optical couplers 5 at the subsequent stage. Then, in the present embodiment, the K reception units 6 perform reception processing and demodulation processing on the wavelength channels by a means similar to the first embodiment.

As a result, according to the present embodiment, K WDM wavelength channels can be frequency-shifted collectively, and a WDM configuration in which optical signals of respective spatial modes propagated through a transmission path fiber each include K wavelength multiplex signals can be supported.

Note that, in a case where a WDM signal including K wavelength multiplex signals is handled in configurations of the first to third embodiments, K space-frequency conversion units 4 (or 4A, 4B) need to be included.

On the other hand, according to the present embodiment, there is an effect that the number of space-frequency conversion units can be 1/K times as compared with the first to third embodiments in which each WDM wavelength channel is frequency-shifted.

Note that each of the reception units 6 may be the reception unit 6B of the second embodiment including the band division unit 63.

Fifth Embodiment

The present embodiment is a configuration example in which the frequency shifters 42 in the space-frequency conversion unit 4C of the fourth embodiment are replaced with frequency conversion units 46.

Figure 11:
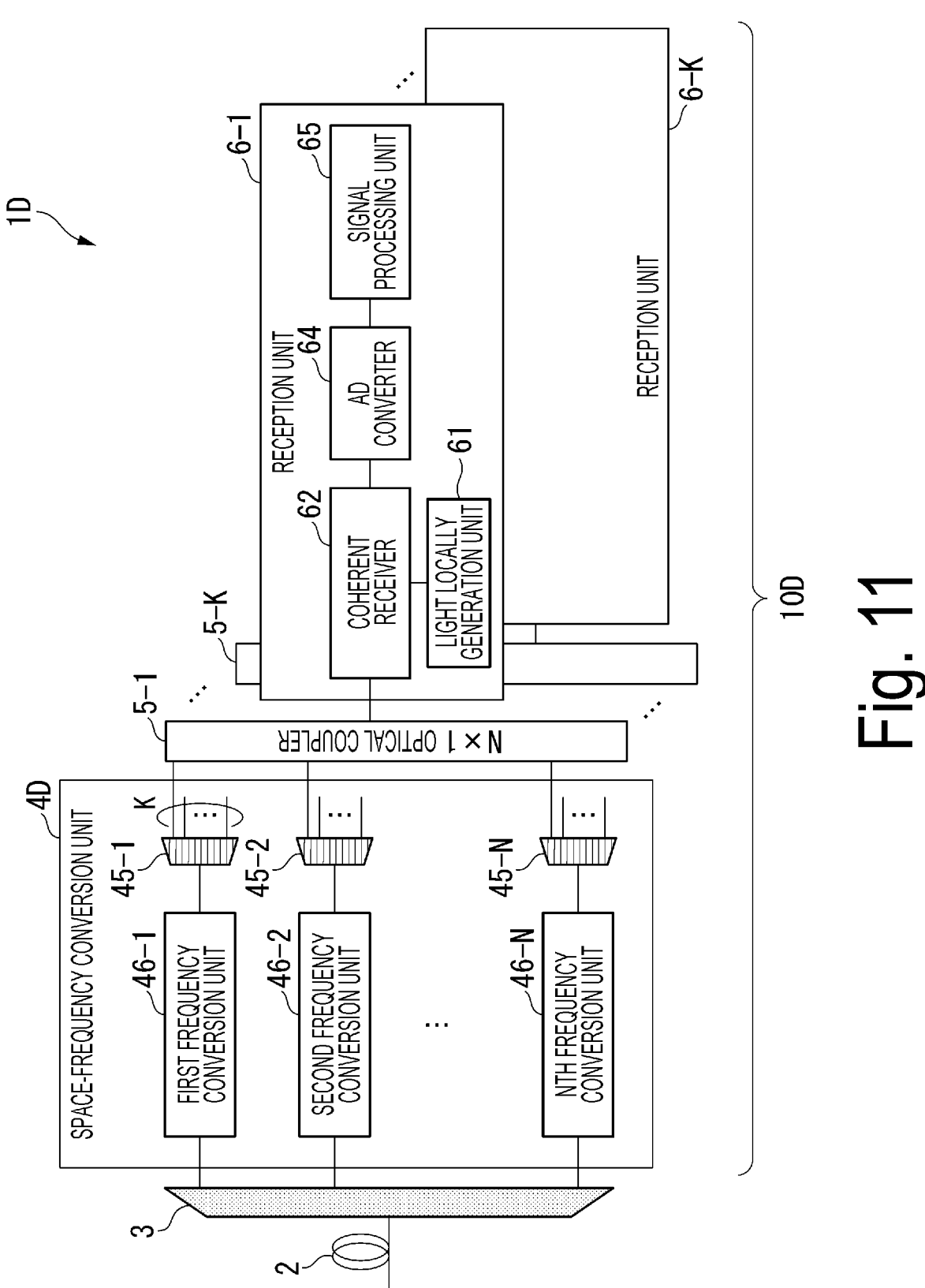
FIG. 11 is a diagram showing a configuration example of a signal detection system according to a fifth embodiment.

FIG. 11 is a diagram showing a configuration example of a signal detection system according to the present embodiment. As shown in FIG. 11, a signal detection system 1D includes a signal detection device 10D and an optical transmission fiber 2.

The signal detection device 10D includes a mode demultiplexer 3, a space-frequency conversion unit 4D (frequency conversion unit), K N×1 optical couplers 5 (multiplexing unit), and K reception units 6 (reception unit 6-1, reception unit 6-2 . . . , reception unit 6-K).

The space-frequency conversion unit 4D includes, for example, N (N is an integer of 1 or more) frequency conversion units 46 (first frequency conversion unit 46-1, second frequency conversion unit 46-2, . . . , Nth frequency conversion unit 46-N) and WDM demultiplexers 45 (WDM demultiplexer 45-1, WDM demultiplexer 45-2, . . . , WDM demultiplexer 45-N).

Note that the configuration shown in FIG. 11 is an example, and the configuration is not limited thereto.

The space-frequency conversion unit 4D converts the frequency of each optical signal. In the present embodiment, the frequency conversion units 46 wavelength-convert optical signals to convert the frequencies of the optical signals, and the WDM demultiplexers 45 further perform demultiplexing for each channel.

The frequency conversion units 46 convert the frequencies of the optical signals by performing wavelength conversion on K WDM wavelength channels. For example, excitation light of $2f_c + n\Delta f$ is also input to the nth frequency conversion unit 46-*n*. As a form that enables wavelength conversion, for example, a nonlinear optical effect using a highly nonlinear fiber, a periodically poled lithium niobate (PPLN), a semiconductor optical amplifier, a silicon waveguide, or the like can be used.

Hereinafter, a frequency conversion example using a PPLN wavelength conversion element will be described.

Figure 12:
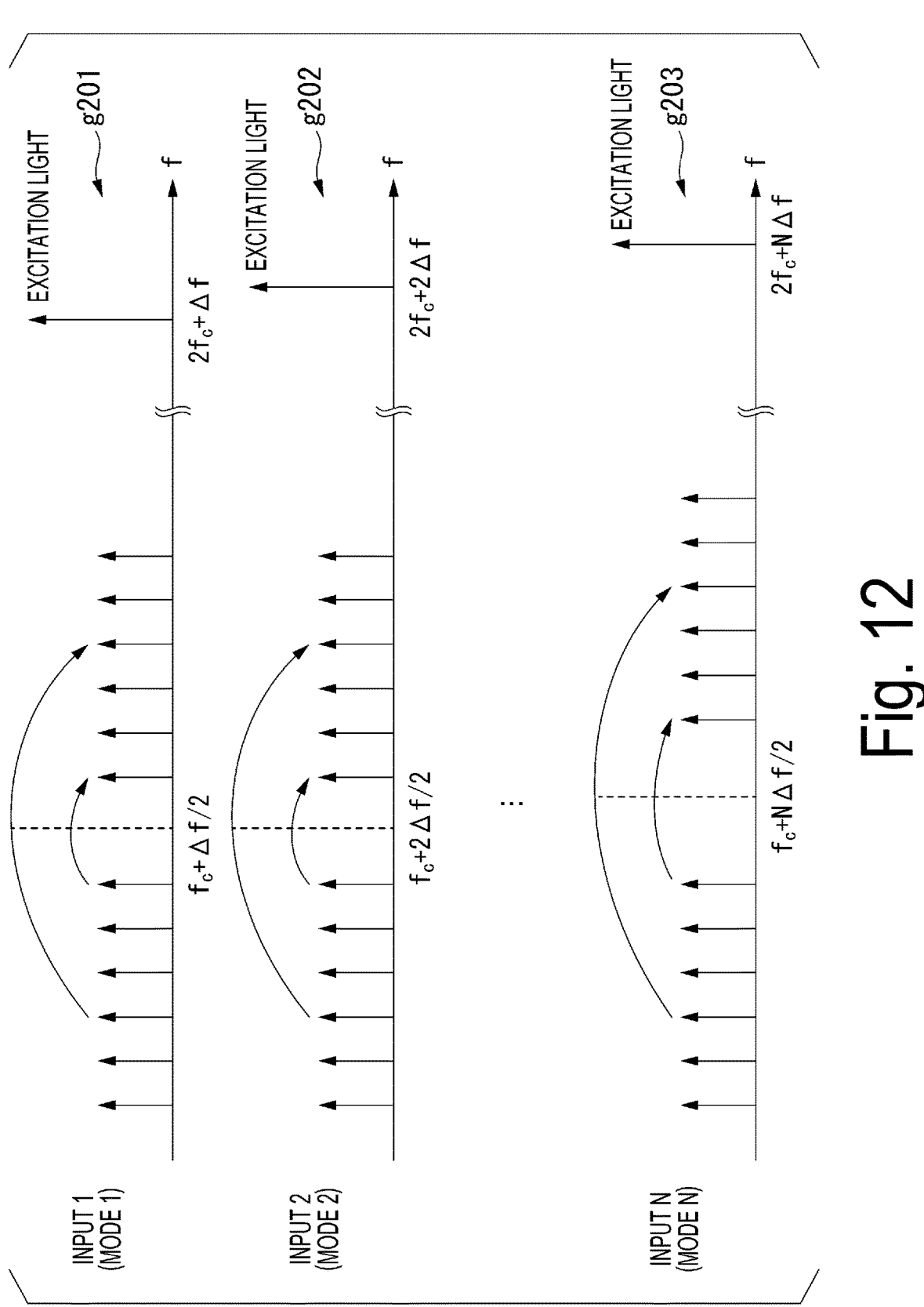
FIG. 12 is a diagram showing states of transition of optical spectra before and after frequency conversion in a first frequency conversion unit to an Nth frequency conversion unit in a space-frequency conversion unit according to the fifth embodiment.

FIG. 12 is a diagram showing states of transition of optical spectra before and after frequency conversion in a first frequency conversion unit to an Nth frequency conversion unit in a space-frequency conversion unit according to the present embodiment. In transition diagrams g201 to g203 of the optical spectra, the horizontal axis represents the frequency. Note that K WDM signals are input to the space-frequency conversion unit 4D as input light.

In a case where excitation light of $2f_c + n\Delta f$ is also input to the nth frequency conversion unit 46-*n*, the original K WDM signals generate output light (idler light) that appears as if it is folded back around a frequency of $f_c + n\Delta/2$ (hereinafter, this is referred to as a center frequency) as a target axis by a non-degenerate optical parametric process of the excitation light and input light as shown in the transition diagrams g201 to g203 of the optical spectra in FIG. 12.

By the frequency of the excitation light to each of the frequency conversion units 46 being shifted by Δf, WDM signals generated in the space-frequency conversion unit 4D can obtain output light shifted by Δf.

Note that wavelength channels to the reception units 6 each have a phase conjugate relationship as compared with an optical signal originally transmitted from the transmission side. In order to return phase conjugate light to the original signal, for example, adjustment by the optical path length in the phase diversity configuration inside the coherent receiver or phase conjugate inversion processing in the digital signal processing unit can be used.

Figure 13:
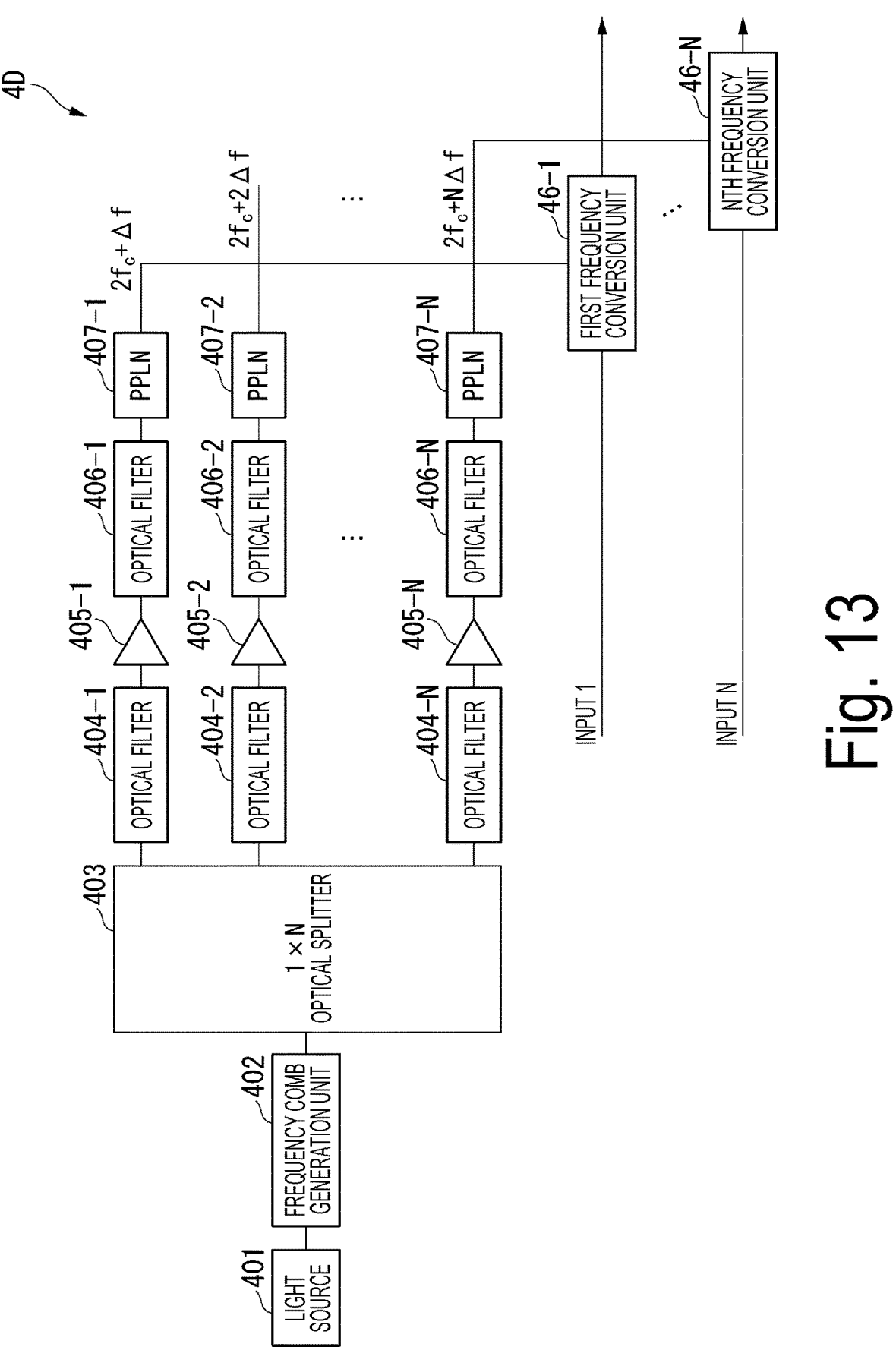
FIG. 13 is a diagram showing a configuration example of the space-frequency conversion unit according to the fifth embodiment.

FIG. 13 is a diagram showing a configuration example of the space-frequency conversion unit according to the present embodiment. As shown in FIG. 13, the space-frequency conversion unit 4D includes, for example, a light source 401, a frequency comb generation unit 402, a 1×N optical splitter 403, N optical filters 404 (404-1, 404-2, . . . , 404-N), N optical amplifiers 405 (405-1, 405-2, . . . , 405-N), N optical filters 406 (406-1, 406-2, . . . , 406-N), N PPLNs 407 (407-1, 407-2, . . . , 407-N), and N frequency conversion units 46 (first frequency conversion unit 46-1, . . . , Nth frequency conversion unit 46-N).

The light source 401 outputs continuous light as seed light of excitation light to the frequency comb generation unit 402.

The frequency comb generation unit 402 generates a frequency comb in which arrangement is performed at frequency intervals of Δf using the continuous light, and outputs the generated frequency comb to the 1×N optical splitter 403. As a method of generating a frequency comb, for example, there are a configuration using a plurality of intensity modulators and a configuration using a mode-locked laser, but the method is not limited thereto.

Next, the 1×N optical splitter 403 splits the frequency comb into N frequency combs and outputs the frequency combs to the respective optical filters 404 (404-1, 404-2, . . . 404-N).

The optical filters 404 (404-1, 404-2, . . . , 404-N) perform filter processing on input optical signals and output the optical signals to the optical amplifiers 405 (405-1, 405-2, . . . , 405-N) corresponding to the optical filters 404.

The optical amplifiers 405 (405-1, 405-2, . . . , 405-N) perform amplification processing on the optical signals on which the filtering processing has been performed and output the optical signals to the optical filters 406 (406-1, 406-2, . . . , 406-N) corresponding to the optical amplifiers 405.

The optical filters 406 (406-1, 406-2, . . . , 406-N) perform filter processing on the input optical signals and output the optical signals to the PPLNs 407 (407-1, 407-2, . . . , 407-N) corresponding to the optical filters 406.

The PPLNs 407 (407-1, 407-2, . . . , 407-N) generate second harmonic waves for the input optical signals and output the second harmonic waves to the frequency conversion units 46 (first frequency conversion unit 46-1, . . . , Nth frequency conversion unit 46-N) corresponding to the PPLNs 407. For example, the PPLN 407-1 outputs an optical signal of $2f_c+\Delta f$ to the first frequency conversion unit 46-1, . . . , and the PPLN 407-N outputs an optical signal of $2f_c+N\Delta f$ to the Nth frequency conversion unit 46-N.

As a result, the space-frequency conversion unit 4D obtains N pieces of excitation light arranged at frequency intervals of Δf from $2f_c+\Delta f$ to $2f_c+N\Delta f$.

By inputting these to the frequency conversion units 46 for difference frequency generation as excitation light, the space-frequency conversion unit 4D can obtain output light that appears as if it is folded back around the center frequency as an axis. Note that the configuration shown in FIG. 13 is an example, and the configuration is not limited thereto. For example, in FIG. 13, for simplicity of the configuration, a method of performing collective generation through frequency comb generation is exemplified as a method of generating N pieces of excitation light, but the present invention is not limited thereto. For example, N pieces of excitation light may be independently generated using N individual light sources.

Next, a processing procedure example of the signal detection device 10D will be described.

Figure 14:
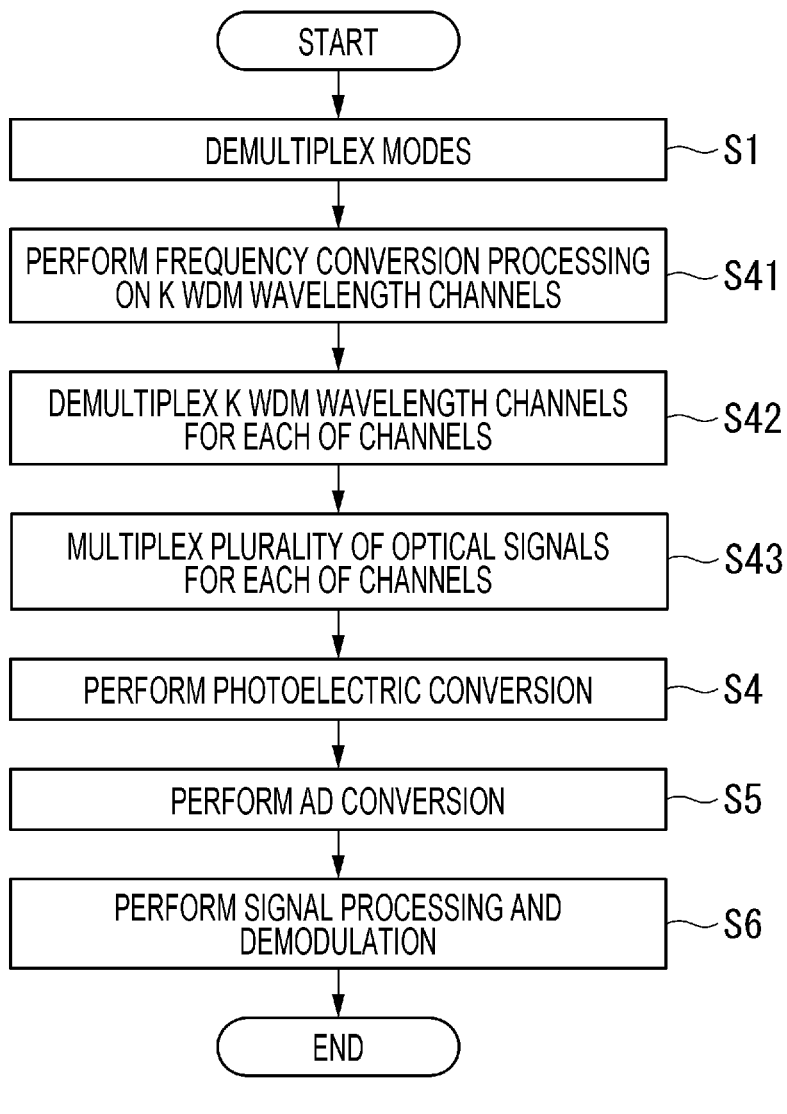
FIG. 14 is a flowchart of a processing procedure example of a signal detection device according to the fifth embodiment.

FIG. 14 is a flowchart of a processing procedure example of a signal detection device according to the present embodiment.

(Step S1) The mode demultiplexer 3 converts N spatial mode signals including a plurality of higher modes excited in the transmission path fiber 2 into N base modes.

(Step S41) The frequency conversion units 46 convert the frequencies of the optical signals by performing wavelength conversion on K WDM wavelength channels.

(Step S42) The WDM demultiplexers 45 demultiplex the K WDM wavelength channels for each of the channels.

(Step S43) The N×1 optical couplers 5 multiplex output signals for each of the wavelength channels in the frequency-converted and demultiplexed optical signals.

(Step S4) The coherent receiver 62 performs conversion into analog electrical signals by photoelectric conversion while maintaining modulation information for a phase and polarization by reception signals and locally generated light input.

(Step S5) The AD converter 64 converts the analog electrical signals into digital signals by sampling processing.

(Step S6) The signal processing unit 65 performs predetermined signal processing including, for example, waveform distortion removal, MIMO type signal processing, frequency offset compensation, phase noise compensation, error correction decoding, and the like, and demodulates the original correct information sequence.

As described above, in the present embodiment, the frequency shifters in the space-frequency conversion unit of the fourth embodiment are replaced with the frequency conversion units 46.

As a result, according to the present embodiment, the electric band limitation of frequency shift amounts in the frequency shifters can be avoided and the shift conversion efficiency (extinction ratio) can be improved. Note that each of the reception units 6 may be the reception unit 6B of the second embodiment including the band division unit 63.

Sixth Embodiment

Unlike the fifth embodiment, the present embodiment is an example in which an operation band of a device in a transmission band is not changed.

Figure 15:
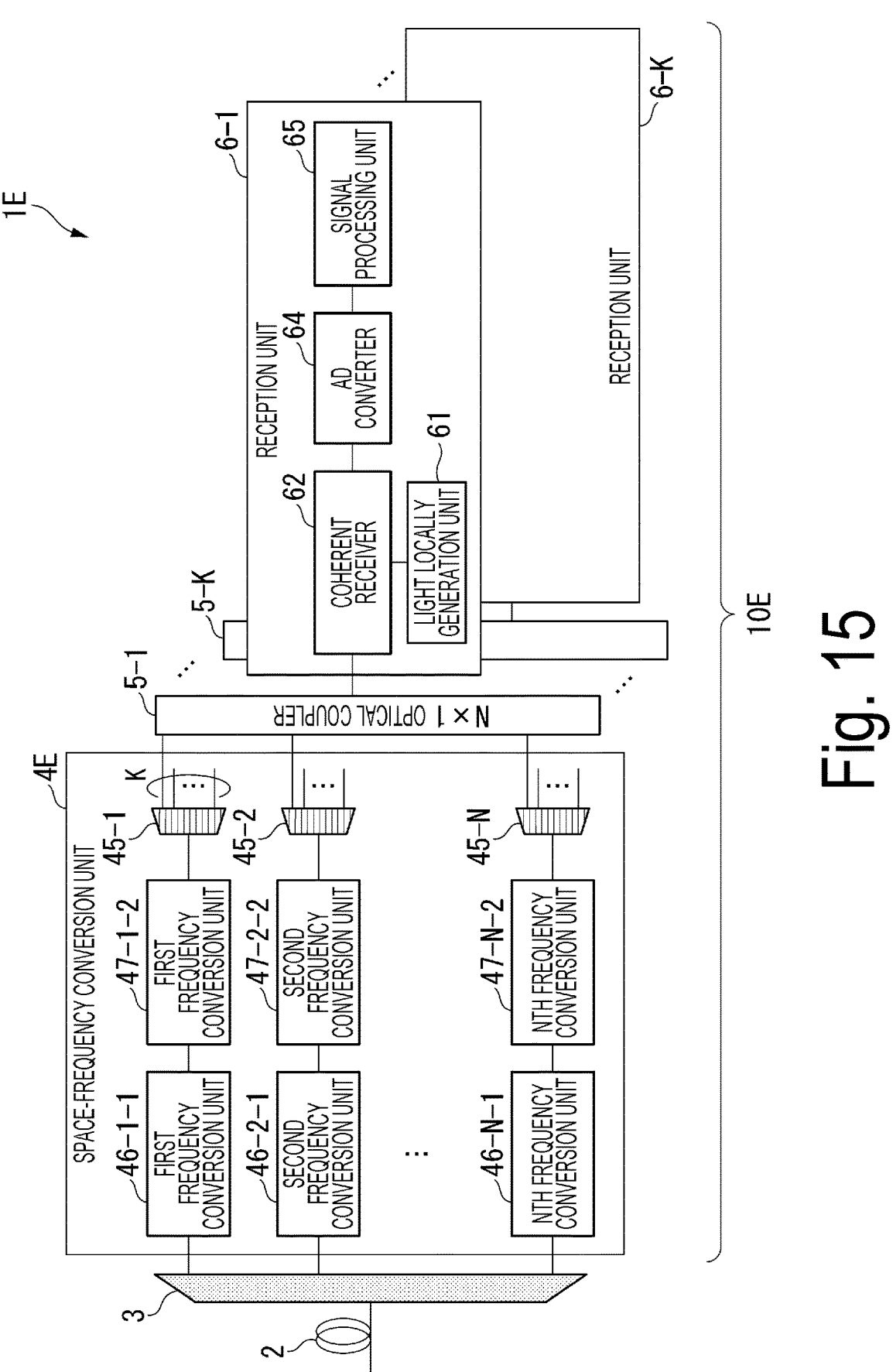
FIG. 15 is a diagram showing a configuration example of a signal detection system according to a sixth embodiment.

FIG. 15 is a diagram showing a configuration example of a signal detection system according to the present embodiment. As shown in FIG. 15, a signal detection system 1E includes a signal detection device 10E and an optical transmission fiber 2.

The signal detection device 10E includes a mode demultiplexer 3, a space-frequency conversion unit 4E (frequency conversion unit), K N×1 optical couplers 5 (multiplexing unit), and K reception units 6 (reception unit 6-1, reception unit 6-2 . . . , reception unit 6-K).

The space-frequency conversion unit 4E includes, for example, N (N is an integer of 1 or more) frequency conversion units 46 (first frequency conversion unit 46-1–1, second frequency conversion unit 46-2–1, . . . , Nth frequency conversion unit 46-N–1), N frequency conversion units 47 (first frequency conversion unit 47-1–1, second frequency conversion unit 47-2–1, . . . , Nth frequency conversion unit 47-N–1), and WDM demultiplexers 45 (WDM demultiplexer 45-1, WDM demultiplexer 45-2, . . . , WDM demultiplexer 45-N).

Note that the configuration shown in FIG. 15 is an example, and the configuration is not limited thereto.

In the present embodiment, the nth frequency conversion unit 47-n–1 is connected in series after the nth frequency conversion unit 46-n–1, and the output of the nth frequency conversion unit 47-n–1 is connected to the input of the WDM demultiplexer 45-n.

The space-frequency conversion unit 4E converts the frequency of each optical signal. In the present embodiment, the frequency conversion units 46 frequency-convert each optical signal, the frequency conversion units 47 perform frequency-conversion again, and then the WDM demultiplexers 45 further perform demultiplexing for each channel.

The frequency conversion units 46 convert the frequencies of optical signals by performing wavelength conversion on K WDM wavelength channels, and output the optical signals obtained by the conversion to the frequency conversion units 47 connected in series to the frequency conversion units 46.

The frequency conversion units 47 convert the frequencies of the optical signals by performing wavelength conversion on the input optical signals, and output the optical signals obtained by the conversion to the WDM demultiplexers 45 connected to the frequency conversion units 47.

As described with reference to FIG. 12, output light from the frequency conversion units 46 is phase conjugate light folded back around the center frequency as an axis. This qualitatively means that output light is generated at a position more distant on the frequency axis than input light as the output light is more distant on the frequency axis from the center frequency and as the number K of WDM signal channels is larger. Therefore, there is concern that a new transmission band in which output light is located is outside the operation band of each element inside the reception unit.

Therefore, in the present embodiment, in order to avoid an event of outside of the operation bands of reception elements being reached due to frequency conversion, frequency conversion units are arranged in series and frequency conversion is continuously performed, so that input light and output light of the frequency conversion units can be handled in the same transmission bands.

There is any way of setting the frequency of excitation light in each of the frequency conversion units 46 and 47. In a setting method, for example, the frequency of each piece of excitation light is set under a condition that, for input light located at a frequency of $f_c$, output light satisfies a frequency of $f_c + n\Delta f$ by the nth frequency conversion unit 47 of the subsequent stage (first frequency conversion unit 47-1–1, second frequency conversion unit 47-2–1, . . . , Nth frequency conversion unit 47-N–1).

Next, a processing procedure example of the signal detection device 10E will be described.

FIG. 16 is a flowchart of a processing procedure example of a signal detection device according to the present embodiment.

(Step S1) The mode demultiplexer 3 converts N spatial mode signals including a plurality of higher modes excited in the transmission path fiber 2 into N base modes.

(Step S41) The frequency conversion units 46 perform wavelength conversion on K WDM wavelength channels.

(Step S51) The frequency conversion units 47 perform conversion of the frequencies of optical signals by performing wavelength conversion on the optical signals on which the wavelength conversion has been performed.

(Step S42) The WDM demultiplexers 45 demultiplex the K WDM wavelength channels for each of the channels.

(Step S43) The N×1 optical couplers 5 multiplex output signals for each of the wavelength channels in the frequency-converted and demultiplexed optical signals.

(Step S4) The coherent receiver 62 performs conversion into analog electrical signals by photoelectric conversion while maintaining modulation information for a phase and polarization by reception signals and locally generated light input.

(Step S5) The AD converter 64 converts the analog electrical signals into digital signals by sampling processing.

(Step S6) The signal processing unit 65 performs predetermined signal processing including, for example, waveform distortion removal, MIMO type signal processing, frequency offset compensation, phase noise compensation, error correction decoding, and the like, and demodulates the original correct information sequence.

As described above, in the present embodiment, two frequency conversion units are arranged in series in each frequency conversion unit inside the space-frequency conversion unit 4E.

As a result, according to the present embodiment, processing can be performed without the operation band of a device in a transmission band being changed.

Note that each of the reception units 6 may be the reception unit 6B of the second embodiment including the band division unit 63.

Seventh Embodiment

The present embodiment is an example in which an operation band of a device in a transmission band is not changed.

Figure 17:
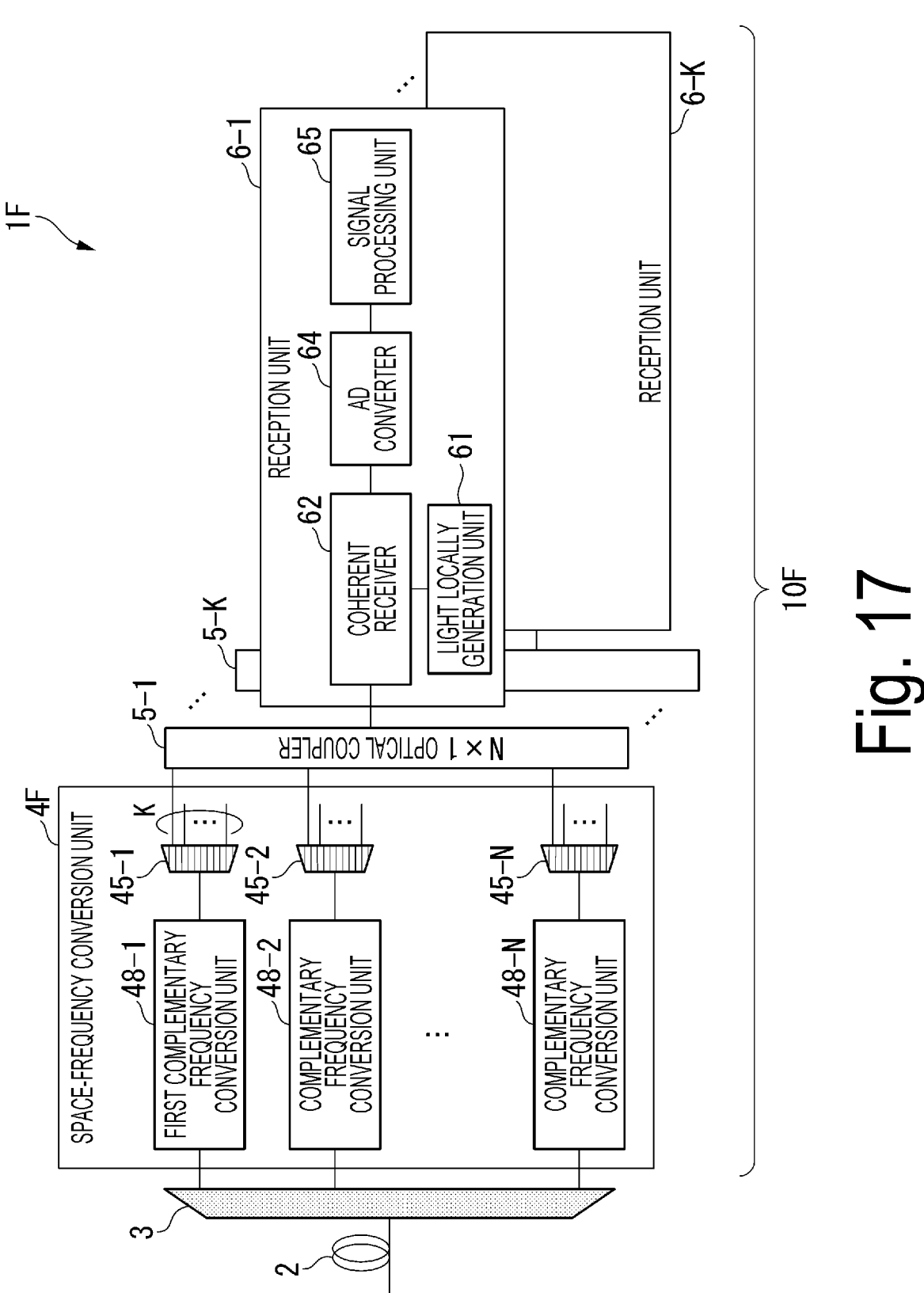
FIG. 17 is a diagram showing a configuration example of a signal detection system according to a seventh embodiment.

FIG. 17 is a diagram showing a configuration example of a signal detection system according to the present embodiment. As shown in FIG. 17, a signal detection system 1F includes a signal detection device 10F and an optical transmission fiber 2.

The signal detection device 10F includes a mode demultiplexer 3, a space-frequency conversion unit 4F (frequency conversion unit), K N×1 optical couplers 5 (multiplexing unit), and K reception units 6 (reception unit 6-1, reception unit 6-2 . . . , reception unit 6-K).

The space-frequency conversion unit 4F includes, for example, N (N is an integer of 1 or more) complementary frequency conversion units 48 (first complementary frequency conversion unit 48-1–1, second complementary frequency conversion unit 48-2–1, . . . , Nth complementary frequency conversion unit 48-N–1) and WDM demultiplexers 45 (WDM demultiplexer 45-1, WDM demultiplexer 45-2, . . . , WDM demultiplexer 45-N).

Note that the configuration shown in FIG. 17 is an example, and the configuration is not limited thereto.

The complementary frequency conversion units 48 separate WDM signals into a low frequency side and a high frequency side by a means such as an optical filter, perform frequency conversion by an optical parametric process on each branch, and perform multiplexing again (see, for example, Reference Literature 3).

Reference Literature 3; Japanese Patent No. 6096831

Next, a processing procedure example of the signal detection device 10F will be described.

Figure 18:
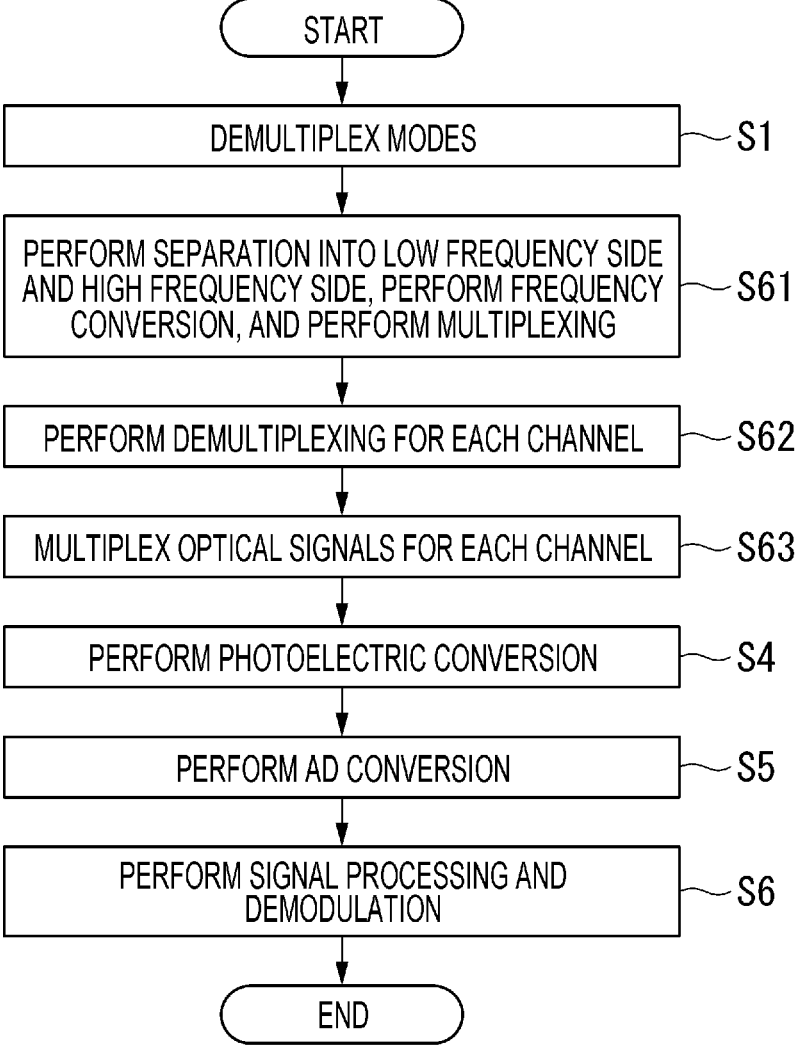
FIG. 18 is a flowchart of a processing procedure example of a signal detection device according to an eighth embodiment.

FIG. 18 is a flowchart of a processing procedure example of a signal detection device according to the present embodiment.

(Step S1) The mode demultiplexer 3 converts N spatial mode signals including a plurality of higher modes excited in the transmission path fiber 2 into N base modes.

(Step S61) The complementary frequency conversion units 48 convert the frequencies of optical signals by performing separation into a low frequency side and a high frequency side and performing frequency conversion by an optical parametric process on each branch, and perform multiplexing again after the conversion.

(Step S62) The WDM demultiplexers 45 perform demultiplexing for each channel.

(Step S63) The N×1 optical couplers 5 multiplex output signals for each wavelength channel.

(Step S4) The coherent receiver 62 performs conversion into analog electrical signals by photoelectric conversion while maintaining modulation information for a phase and polarization by reception signals and locally generated light input.

(Step S5) The AD converter 64 converts the analog electrical signals into digital signals by sampling processing.

(Step S6) The signal processing unit 65 performs waveform distortion removal, MIMO type signal processing, frequency offset compensation, phase noise compensation, error correction decoding, and the like, and demodulates the original correct information sequence.

As described above, in the present embodiment, the space-frequency conversion unit 4F includes the complementary frequency conversion units 48.

Thus, according to the present embodiment, input light and output light of the wavelength conversion units can be handled in the same transmission bands.

Note that each of the reception units 6 may be the reception unit 6B of the second embodiment including the band division unit 63.

Note that, in each of the above-described embodiments, all or some of each function of the functions of the space-frequency conversion unit (frequency conversion units) and the reception unit may be formed using a processor such as a central processing unit (CPU) and a memory. All or some of each function of the functions of the space-frequency conversion unit and the reception unit function as, for example, a frequency shifter unit, a coherent receiver, an AD converter, and a signal processing unit by the processor executing a program. All or some of each function of the functions of the space-frequency conversion unit and the reception unit may be implemented using hardware such as an application specific integrated circuit (ASIC), a programmable logic device (PLD), or a field programmable gate array (FPGA). The program may be recorded on a computer-readable recording medium. The computer-readable recording medium is, for example, a portable medium such as a flexible disk, a magneto-optical disc, a ROM, a CD-ROM, or a semiconductor storage device (for example, solid state drive (SSD)), or a storage device such as a hard disk or a semiconductor storage device embedded in a computer system. The above program may be transmitted via an electrical communication line or an optical communication line, or may be supplied from a cloud.

Description of Effects

Hereinafter, an example of an evaluation result performed to confirm the effects of the above-described embodiments will be described.

In order to confirm the effects of the first embodiment, a transmission experiment using a three-mode multi-mode fiber was performed.

First, quadrature phase shift keying (QPSK) signals of 6 GBaud were generated by an optical modulator, and input signals of three systems by a delay system were input to a mode multiplexer to obtain three-mode mode multiplexed optical signals. Next, the optical signals were input to a mode demultiplexer of a pair connected by a patch cord of the multi-mode fiber, and were converted again into base modes (LP01) of three systems. At this time, the three-system base mode signals are mixed with each other. This is because, although the transmission path in the transmission evaluation system is short, a non-negligible level of coupling occurs between the three modes due to imperfection of the multiplexer/demultiplexer. Among the three-system base mode signals, a frequency shift of +12 (GHz) was given to a signal originally in the LP11a mode by a frequency shifter, and on the other hand, a frequency shift of −12 (GHz) was given to a signal originally in the 11b mode by a frequency shifter 42. Note that the LP11a mode and the LP11b mode are propagation modes. Thereafter, the three base mode signals were multiplexed by a 3×1 coupler and received by the single reception unit 6.

Figure 19:
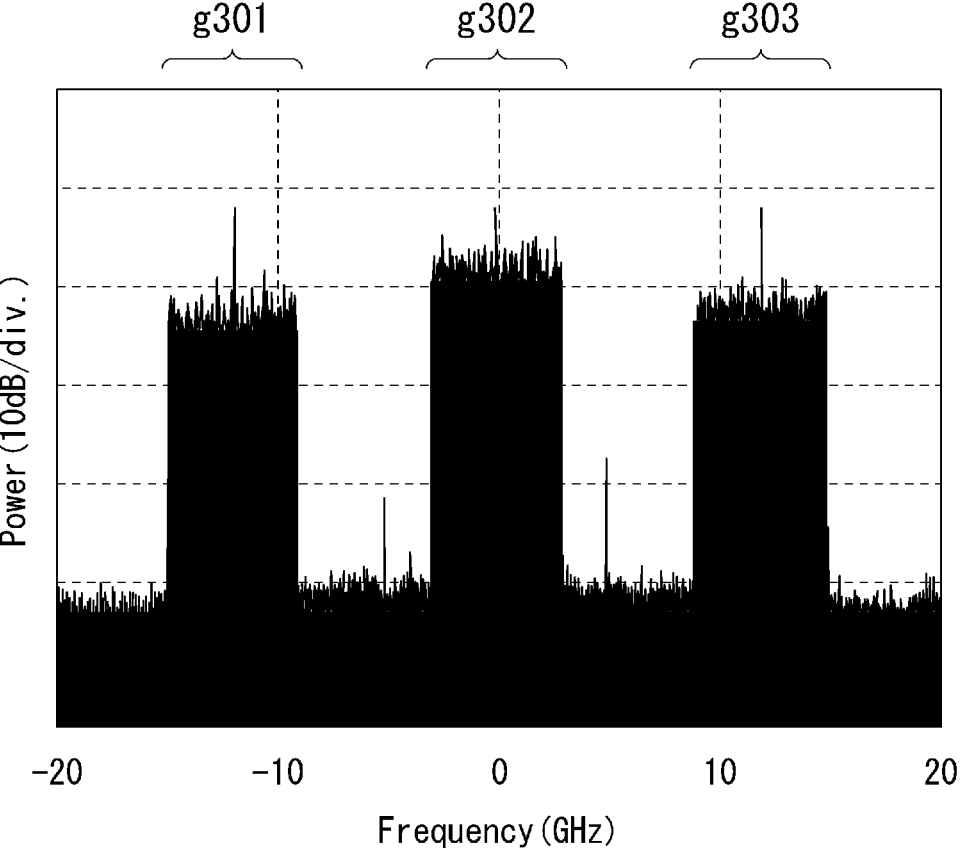
FIG. 19 is a diagram showing a spectrum example of reception signals in a digital domain obtained by the signal detection device of the first embodiment.

FIG. 19 is a diagram showing a spectrum example of reception signals in a digital domain obtained by the signal detection device 10 of the first embodiment. In FIG. 19, the horizontal axis represents frequency (GHz), and the vertical axis represents intensity (10 dB/div). As shown in FIG. 19, in the evaluation result, it can be seen that signals of a mode 3 (LP11b) (g301), a mode 1 (LP01) (g302), and a mode 2 (LP11a) (g303) are frequency-multiplexed every 12 (GHz) from the low frequency side.

Next, the signal processing unit 65 performed frequency shift by digital signal processing on signals of the mode 2 and the mode 3 of the present signals to convert the signals into baseband signals, and then demodulated original three QPSK signal sequences by MIMO equalization processing.

FIG. 20 is a diagram showing constellation examples of QPSK obtained according to the first embodiment. As shown in FIG. 20, in the evaluation, it can be confirmed that the signals of the three modes are received with high quality by the single reception unit 6 in the signal detection device 10 of the first embodiment.

As described above, the signal detection device 10 (or 10A, 10B, 10C, 10D, 10E, 10F) of each of the embodiments includes the mode demultiplexer 3 that converts N spatial mode signals including a plurality of higher modes excited in the transmission path fiber 2 into N base modes and outputs the N basis modes, the space-frequency conversion unit 4 (or 4B, 4C, 4D, 4E, 4F) (frequency conversion unit) that converts the frequencies of respective optical signals, the N×1 optical coupler 5 (combiner) that multiplexes N optical signals, and the reception unit 6 (or 6A) that photoelectrically converts a multiplexed optical signal while maintaining modulation information for a phase and polarization, performs digital signal conversion and signal processing, and demodulates an original information sequence.

As a result, according to each of the embodiments, in a transmission system to which the space-division multiplexing transmission technology is applied, a signal of a plurality of modes can be received by a reception unit of which the number is smaller than the number of the modes, so that the configuration in the reception device is reduced, the device size and power consumption can be reduced, and the manufacturing cost can be reduced.

In recent years, an optical transceiving module having characteristics of small size, low cost, and low power consumption and an optical transceiver using the same have been implemented by the digital coherent transmission technology without using a complicated phase locked loop or the like. With the advent of the digital coherent transmission technology, not only the reception sensitivity at the time of optical transmission forming a large-capacity optical network can be improved, but also the information transmission efficiency can be dramatically improved by information being superimposed on the amplitude, phase, or polarization of an optical carrier wave.

By each of the embodiments being applied to digital coherent transmission, the configuration in the reception device can be reduced.

Modifications

In each of the above-described embodiments, the signal detection device 10 (or 10A, 10B, 10C, 10D, 10E, 10F) may include a functional unit other than the above-described configuration.

Furthermore, in the above evaluation, the example using a QPSK signal has been described, but the present invention is not limited thereto. A signal input to the signal detection device 10 (or 10A, 10B, 10C, 10D, 10E, 10F) may be, for example, binary phase shift keying (BPSK), differential phase shift keying (DPSK), or the like.

Hereinabove, embodiments of this invention are described in detail with reference to the drawings, however, specific configurations are not limited to these embodiments, and include designs, etc. without departing from the spirit of this invention.

INDUSTRIAL APPLICABILITY

The present invention is applicable to a transmission system.

REFERENCE SIGNS LIST 1, 1A, 1B, 1C Signal detection system
10, 10A, 10B, 10C Signal detection device
2 Optical transmission fiber
3 Mode demultiplexer
4, 4B, 4C, 4D, 4E, 4F Space-frequency conversion unit
5, 5-1, 5-K N×1 optical coupler
6, 6-1, 6-K, 6A Reception unit
41 Clock unit (first clock unit 41-1, second clock unit 41-2, Nth clock unit 41-N)
42 Frequency shifter (first frequency shifter 42-1, second frequency shifter 42-2, Nth frequency shifter 42-N, first frequency shifter 42-1–1, first frequency shifter 42-1–2, second frequency shifter 42-2–1, second frequency shifter 42-2–2, Nth frequency shifter 42-N–1, Nth frequency shifter 42-N–2)
43, 43-1, 43-2, 43-N Polarized light beam splitter
44, 44-1, 44-2, 44-N Polarized light beam combiner
45, 45-1, 45-2, 45-N WDM demultiplexer
46 Frequency conversion unit (first frequency conversion unit 46-1, second frequency conversion unit 46-2, Nth frequency conversion unit 46-N)
47 Frequency conversion unit (first frequency conversion unit 47-1, second frequency conversion unit 47-2, Nth frequency conversion unit 47-N)
61 Light locally reception unit
62 Coherent receiver
63 Band division unit
64 AD converter
65 Signal processing unit
401 Light source
402 Frequency comb generation unit
403 1×N optical splitter
404, 404-1, 404-2, 404-N Optical filter
405, 405-1, 405-2, 405-N Optical amplifier
406, 406-1, 406-2, 406-N Optical filter
407, 407-1, 407-2, 407-N PPLN

The invention claimed is:

1. A signal detection device comprising:
   a mode demultiplexer configured to convert N (N is a natural number) spatial mode signals including a plurality of higher modes excited in a transmission path fiber into N base modes and output the N basis modes;
   a frequency conversion unit configured to convert frequencies of respective N optical signals into frequencies different from each other;
   a multiplexing unit configured to multiplex the N optical signals having frequencies that have been converted; and
   a reception unit configured to photoelectrically convert a multiplexed optical signal while maintaining modulation information for a phase and polarization, perform digital signal conversion and signal processing, and demodulate an original information sequence.

2. The signal detection device according to claim 1, wherein the reception unit is configured to perform digital signal processing and signal processing after dividing a signal obtained by photoelectrical conversion into parallel signals including a plurality of signal bands.

3. The signal detection device according to claim 1, wherein the frequency conversion unit is configured to perform the frequency conversion for each piece of polarization after performing polarization processing on input light, and multiplex a signal on which the frequency conversion has been performed.

4. The signal detection device according to claim 1, wherein the frequency conversion unit is configured to demultiplex a wavelength multiplexed signal after performing the frequency conversion.

5. The signal detection device according to claim 1, wherein the frequency conversion unit is configured to perform the frequency conversion, perform frequency conversion on an optical signal again, and then demultiplex a wavelength multiplexed signal.

6. The signal detection device according to claim 1, wherein the frequency conversion unit is configured to perform separation into a low frequency side and a high frequency side, perform frequency conversion by an optical parametric process on each branch, and then demultiplex a wavelength multiplexed signal.

7. A signal detection method performed by a signal detection device, comprising:
   converting N (N is a natural number) spatial mode signals including a plurality of higher modes excited in a transmission path fiber into N base modes and outputting the N basis modes;
   converting N optical signals into frequencies different from each other;
   multiplexing the N optical signals having frequencies that have been converted; and
   photoelectrically converting a multiplexed optical signal while maintaining modulation information for a phase and polarization, performing digital signal conversion and signal processing, and demodulating an original information sequence.

8. A non-transitory computer-readable storage medium storing a program for causing a computer to:

convert N (N is a natural number) spatial mode signals including a plurality of higher modes excited in a transmission path fiber into N base modes and output the N basis modes;

convert frequencies of respective N optical signals into frequencies different from each other;

multiplex the N optical signals having frequencies that have been converted; and photoelectrically convert a multiplexed optical signal while maintaining modulation information for a phase and polarization, perform digital signal conversion and signal processing, and demodulate an original information sequence.

\* \* \* \* \*